United States Patent
Gulick, Jr. et al.

(10) Patent No.: US 11,313,153 B2
(45) Date of Patent: Apr. 26, 2022

(54) SECURITY APPARATUS

(71) Applicant: Scorpion Security Products, Inc., Vestal, NY (US)

(72) Inventors: Franklyn W. Gulick, Jr., Vestal, NY (US); Gary R. Page, Chenango Forks, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 17/051,932

(22) PCT Filed: May 3, 2019

(86) PCT No.: PCT/US2019/030559
§ 371 (c)(1),
(2) Date: Oct. 30, 2020

(87) PCT Pub. No.: WO2019/213490
PCT Pub. Date: Nov. 7, 2019

(65) Prior Publication Data
US 2021/0123268 A1    Apr. 29, 2021

Related U.S. Application Data

(60) Provisional application No. 62/803,978, filed on Feb. 11, 2019, provisional application No. 62/744,735, (Continued)

(51) Int. Cl.
*E05B 73/00* (2006.01)
*F16M 11/04* (2006.01)
(Continued)

(52) U.S. Cl.
CPC .......... *E05B 73/00* (2013.01); *F16M 11/041* (2013.01); *F16M 11/22* (2013.01); *F16M 13/02* (2013.01);
(Continued)

(58) Field of Classification Search
CPC combination set(s) only.
See application file for complete search history.

(56) References Cited

U.S. PATENT DOCUMENTS

| 1,102,859 A | | 7/1914 | Blackwell | |
| 4,473,207 A | * | 9/1984 | Nascher | A47G 1/1646 248/488 |

(Continued)

FOREIGN PATENT DOCUMENTS

| CN | 206973217 U | 2/2018 |
| KR | 101328687 B1 | 1/2013 |
| WO | 2017184517 A1 | 10/2017 |

OTHER PUBLICATIONS

International Searching Authority, International Search Report and Written Opinion, International Application No. PCT/US2019/030559, dated Jul. 12, 2019, (11 Pages).

(Continued)

*Primary Examiner* — Monica E Millner
(74) *Attorney, Agent, or Firm* — Barclay Damon LLP

(57) ABSTRACT

A security apparatus for a portable electronic device comprises at least one support member comprising opposing side surfaces and a plurality of support member surface features. At least one of the opposing side surfaces comprises a first engagement structure. One of the at least two arms comprises a second engagement structure configured to slidably engage the first engagement structure allowing movement in a first direction and opposing second direction. At least one locking assembly is positioned on at least one of the at least two arms and comprises a plurality of lock surface features configured to couple to the plurality of support member surface features. In a locked position, the at least one of the at least two arms is enabled to slide in the first direction. In an unlocked position, the at least one of the at least two arms is enabled to slide in the second direction.

20 Claims, 32 Drawing Sheets

Related U.S. Application Data filed on Oct. 12, 2018, provisional application No. 62/666,931, filed on May 4, 2018.

(51) Int. Cl.
  *F16M 11/22* (2006.01)
  *F16M 13/02* (2006.01)
  *H04B 1/3877* (2015.01)

(52) U.S. Cl.
  CPC ....... *H04B 1/3877* (2013.01); *F16M 2200/02* (2013.01)

(56) References Cited

U.S. PATENT DOCUMENTS

| | | | | |
|---|---|---|---|---|
| 8,066,241 B2* | 11/2011 | Yu | ........................ | F16M 11/041 |
| | | | | 248/286.1 |
| 8,235,334 B1 | 8/2012 | Kobal | | |
| 8,469,325 B2* | 6/2013 | Yu | ........................ | F16M 13/022 |
| | | | | 248/316.1 |
| 8,864,089 B2* | 10/2014 | Hung | ................... | F16M 11/041 |
| | | | | 248/274.1 |
| 9,161,466 B2* | 10/2015 | Huang | ................. | F16M 11/105 |
| 9,420,712 B2* | 8/2016 | Yang | ...................... | F16M 11/38 |
| 9,568,141 B1* | 2/2017 | Zaloom | .................. | F16M 11/24 |
| 9,890,899 B2* | 2/2018 | Theis | ................... | F16M 13/022 |
| 2007/0043371 A1 | 2/2007 | Teague et al. | | |
| 2013/0270850 A1 | 10/2013 | Fan | | |
| 2013/0301216 A1* | 11/2013 | Trinh | ..................... | A47F 7/0246 |
| | | | | 361/679.58 |
| 2017/0188724 A1* | 7/2017 | Lin | ...................... | F16M 11/041 |

OTHER PUBLICATIONS

International Bureau, International Preliminary Report on Patentability, International Application No. PCT/US2019/030559, dated Nov. 19, 2020 (10 pages).

European Patent Office, Extended Search Report, Application No. 19796333.3, Patent No. 3788221, dated Jan. 1, 2022 (38 pages)

* cited by examiner

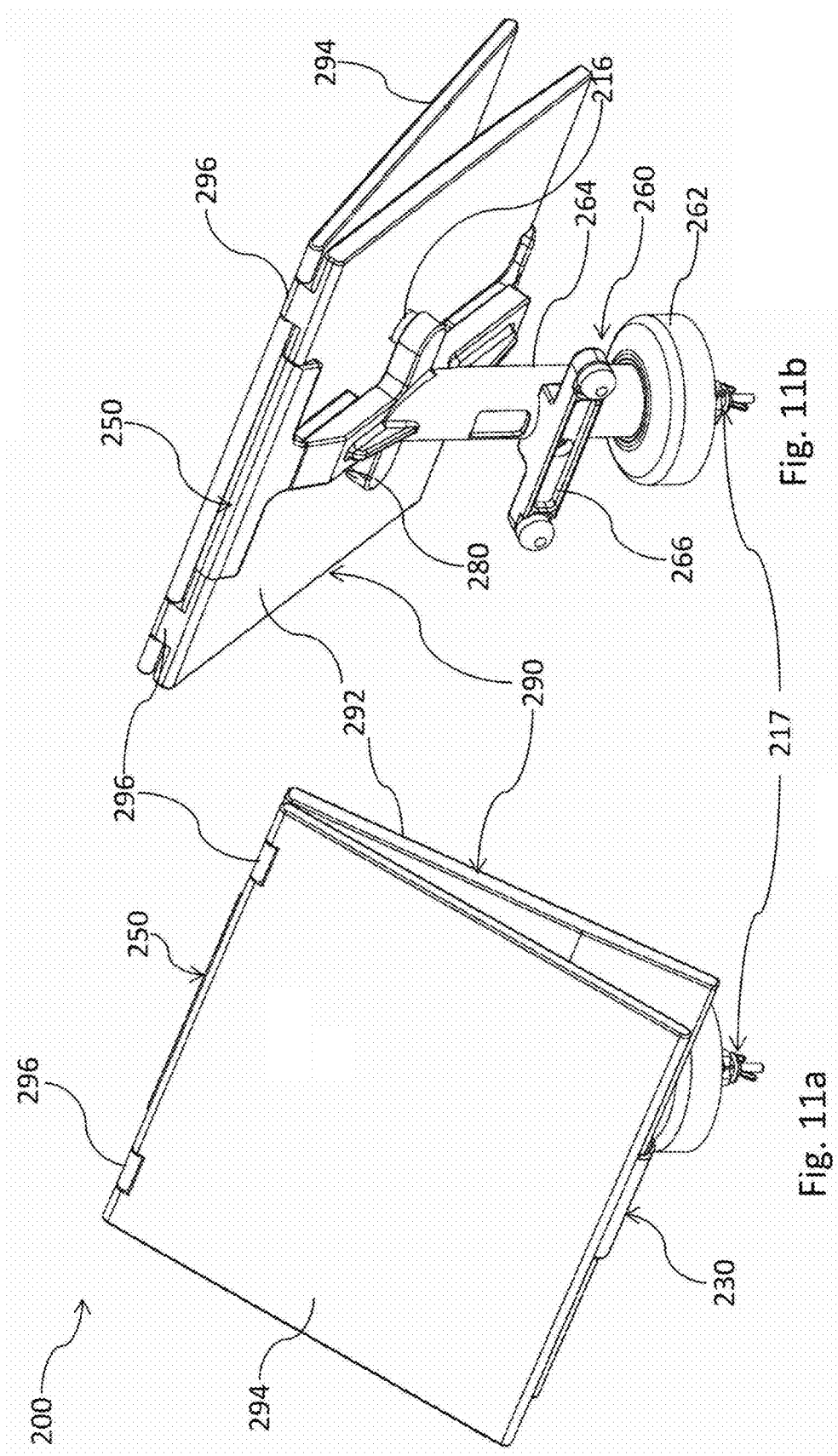

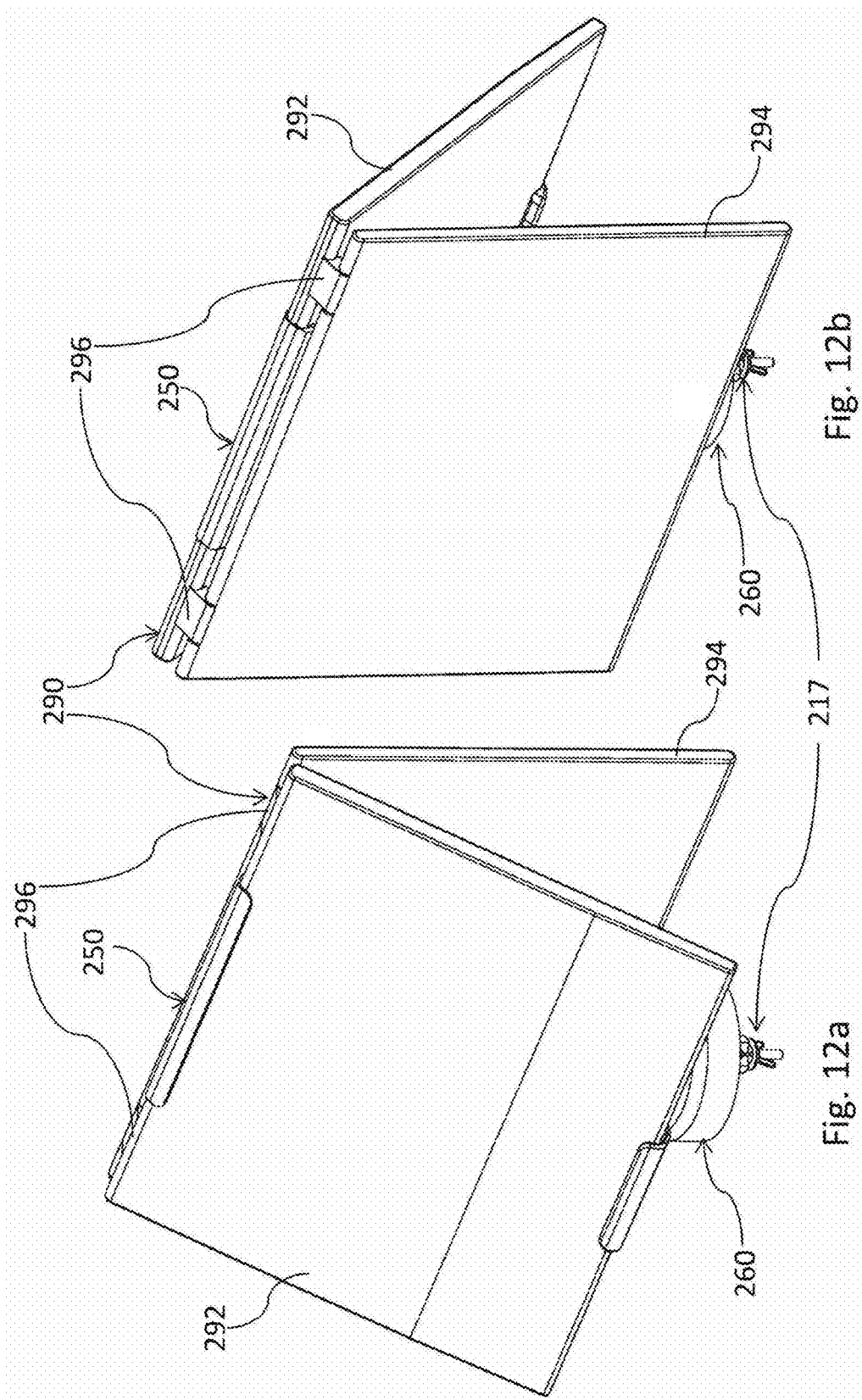

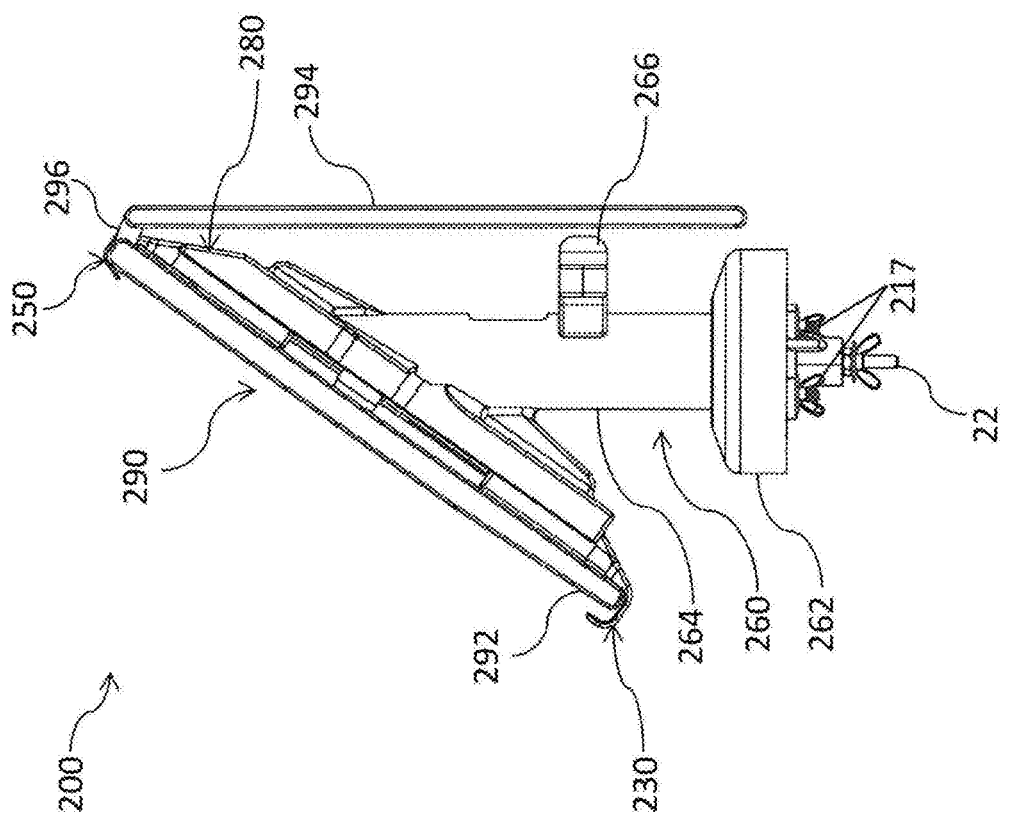
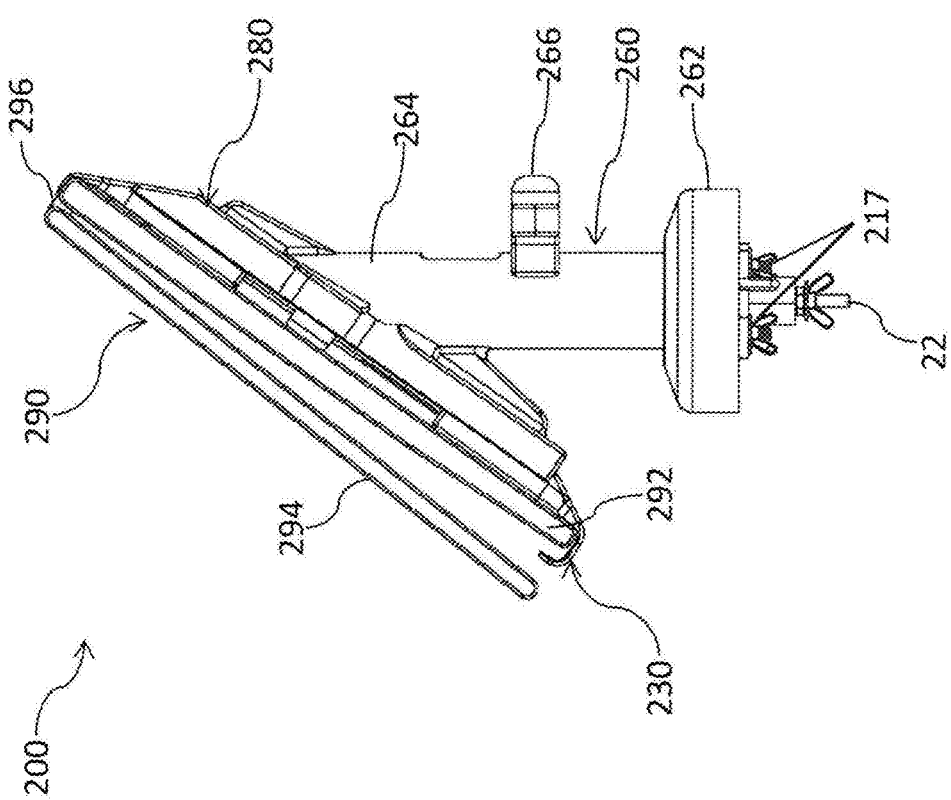

SECURITY APPARATUS

CROSS-REFERENCE TO RELATED APPLICATIONS

This application claims the benefit of and priority to U.S. Provisional Patent Application No. 62/666,931, filed May 4, 2018, U.S. Provisional Patent Application No. 62/744,735, filed Oct. 12, 2018, and U.S. Provisional Patent Application No. 62/803,978, filed Feb. 11, 2019. The entirety of these applications is incorporated herein by reference.

TECHNOLOGICAL FIELD

This invention relates to a security apparatus that is easily locked and unlocked without the use of tools, and which facilitates functional and secure display of portable, mobile, or handheld electronic devices.

BACKGROUND

Retailers sell a wide range of portable or hand held electronic devices that can assist in or perform a multitude of tasks for the a user or customer. Part of the purchasing experience is having the ability to examine and test the device. This is done using floor models that are fitted with some form of security apparatus to prevent theft of the portable electronic device.

There are many different types of security apparatuses used in retail settings. Some security apparatuses allow a customer to pick up the electronic device while keeping it attached or tethered to the security apparatus. Other security apparatuses comprise a fixed portion that remains coupled to the display surface and a second portion coupled to the electronic device. These types of security apparatuses allow the customer to freely hold the electronic device while the second portion of the security apparatus remains attached to the electronic device. Unfortunately, these devices are not suitable for all types of electronic devices.

In all situations, an employee must use a tool or key to unlock the security apparatus in order to remove the electronic device completely. These keys are proprietary to the particular security apparatus and are frequently lost or even stolen. Consequently, retailers waste money ordering extra keys every year. Other security apparatuses use biometric sensors which allow only certain employees the ability to unlock the security apparatus in order to remove the electronic device. While these devices eliminate the need for a separate key, they are expensive and require frequent updates to the biometric database due to employee turnover.

These are just some of the problems associated with current security apparatuses for handheld or portable electronic devices.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which:

FIG. 7a illustrates a partial top plan view of an embodiment of a support member of the security apparatus;

FIG. 7b illustrates a close up side plan view of area A from FIG. 7a;

FIG. 11a illustrates a front perspective view of an embodiment of the security apparatus securing a laptop computer in a closed position;

FIG. 11b illustrates a rear perspective view of an embodiment of the security apparatus securing a laptop computer in a closed position;

FIG. 12a illustrates a front perspective view of an embodiment of the security apparatus securing a laptop computer in an open position;

FIG. 12b illustrates a rear perspective view of an embodiment of the security apparatus securing a laptop computer in an open position;

FIG. 13a illustrates a side perspective view of an embodiment of the security apparatus securing a laptop computer in a closed position;

FIG. 13b illustrates a side perspective view of an embodiment of the security apparatus securing a laptop computer in an open position;

SUMMARY

Figure 1:
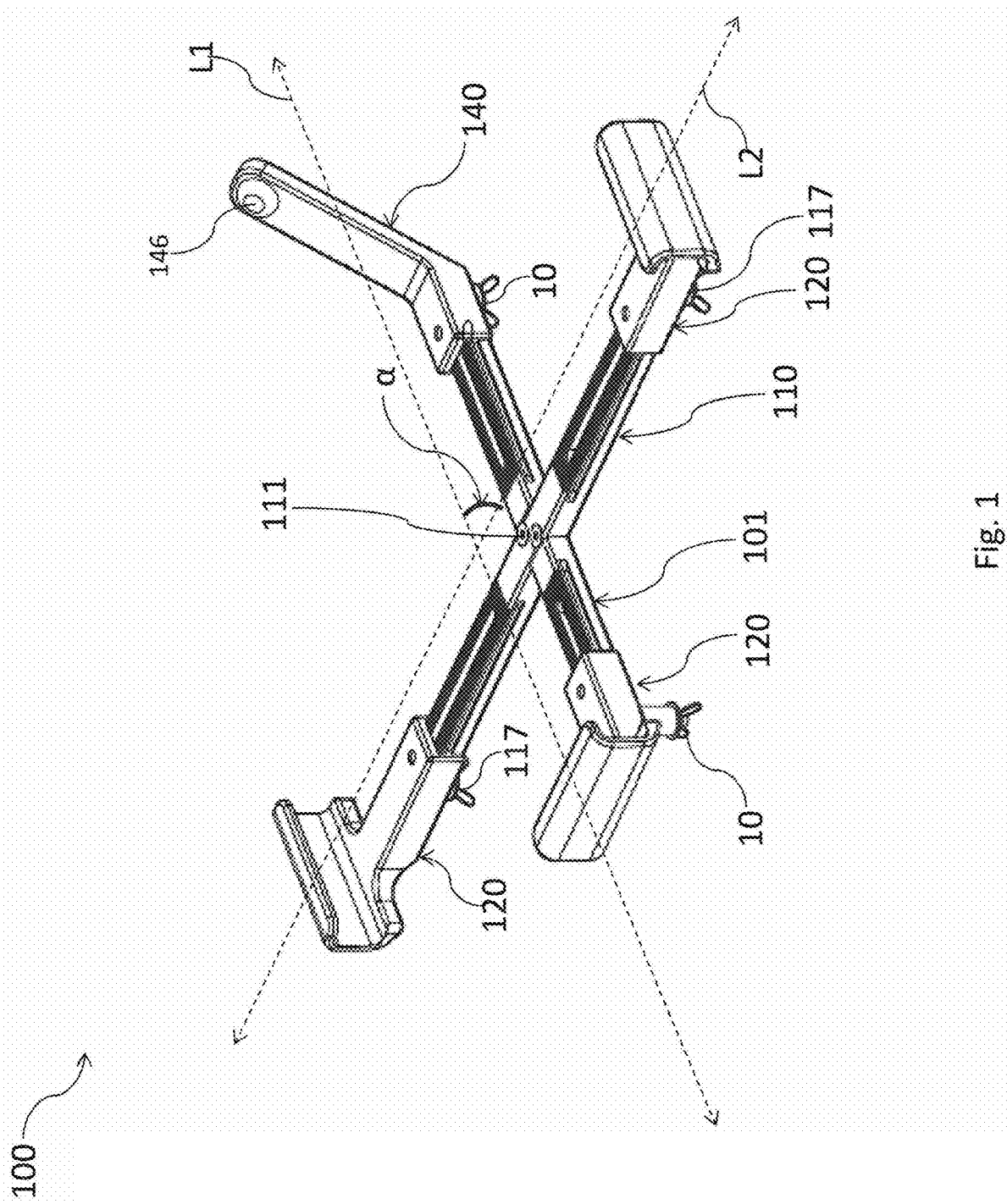
FIG. 1 illustrates a perspective front view of an embodiment of a security apparatus.

A security apparatus for a portable electronic device comprises at least one support member extending along an axis. The at least one support member comprises a top surface, a bottom surface, wherein one of the top and bottom surfaces defines a plurality of support member surface features, at least one elongated opening extending from the top surface to the bottom surface of the at least one support member, and opposing side surfaces. At least one of the opposing side surfaces comprises a recess. At least two arms are coupled to the at least one support member and configured to hold a portable electronic device. At least one of the at least two arms comprises a protrusion configured to slidably engage the recess of the at least one opposing side of the at least one support member allowing movement of the at least one of the at least two arms to slide in a first direction and a second direction opposite of the first direction along the at least one support member. At least one locking assembly is positioned on at least one of the at least two arms and comprises a depression plate, an engagement plate comprising a plurality of lock surface features and configured to engage with the support member surface features, and an extension coupled to the depression plate at one end and coupled to the engagement plate at an opposing end. The extension further configured to traverse the at least one elongated opening. The locking assembly is configured that when in a locked position, the support member surface features and the lock surface features are coupled enabling the at least one of the at least two arms to slide in the first direction along the at least one support member but preventing the at least one of the at least two arms to slide in the first direction along the at least one support member. The locking assembly is further configured in an unlocked position by pressing on the depression plate such that the engagement plate is moved away from the at least one support member and the support member surface features and the lock surface features are decoupled enabling the at least one of the at least two arms to slide in the second direction along the at least one support member.

A security apparatus for a portable electronic device comprises at least one support member extending along an axis. The at least one support member comprises a top surface, a bottom surface, wherein one of the top and bottom surfaces defines a plurality of support member surface features, and opposing side surfaces. At least one of the opposing side surfaces comprises a first engagement structure. At least two arms are coupled to the at least one support member and configured to hold a portable electronic device. At least one of the at least two arms comprises a second engagement structure configured to slidably engage the first engagement structure of the at least one opposing side of the at least one support member allowing movement of the at least one of the at least two arms to slide in a first direction and a second direction opposite of the first direction along the at least one support member. At least one locking assembly is positioned on at least one of the at least two arms and comprises a plurality of lock surface features configured to couple to the plurality of support member surface features. The locking assembly is configured that when in a locked position, the support member surface features and the lock surface features are coupled enabling the at least one of the at least two arms to slide in the first direction along the at least one support member but preventing the at least one of the at least two arms to slide in the first direction along the at least one support member. The locking assembly is further configured that when configured in an unlocked position by pressing on the locking assembly, the support member surface features and the lock surface features are decoupled enabling the at least one of the at least two arms to slide in the second direction along the at least one support member.

A security apparatus for a portable electronic device comprises at least one support member extending along an axis. The at least one support member comprises a top surface, a bottom surface, wherein one of the top and bottom surfaces defines a plurality of support member surface features, at least one elongated opening extending from the top surface to the bottom surface of the at least one support member, and opposing side surfaces. At least one of the opposing side surfaces comprises a first engagement structure. At least two arms are coupled to the at least one support member and configured to hold a portable electronic device. At least one of the at least two arms comprises a second engagement structure configured to slidably engage the first engagement structure of the at least one opposing side of the at least one support member allowing movement of the at least one of the at least two arms to slide in a first direction and a second direction opposite of the first direction along the at least one support member. At least one locking assembly is positioned on at least one of the at least two arms and configured to traverse the at least one elongated opening. The at least one locking assembly comprises a plurality of lock surface features configured to couple to the plurality of support member surface features. The locking assembly is configured that when in a locked position, the support member surface features and the lock surface features are coupled enabling the at least one of the at least two arms to slide in the first direction along the at least one support member but preventing the at least one of the at least two arms to slide in the first direction along the at least one support member. The locking assembly is configured that when in an unlocked position by pressing on the locking assembly, the support member surface features and the lock surface features are decoupled enabling the at least one of the at least two arms to slide in the second direction along the at least one support member.

DETAILED DESCRIPTION

FIGS. 1-9 illustrate an embodiment of a tool-less detachable security apparatus ("security apparatus") 100, which generally comprises a first support member 101 and a second support member 110. The first support member 101 and the second support member 110 each extend along an axis L1, L2, (FIGS. 1 and 2a) respectively. The first and second support members 101, 110 are fastened together using one or more fasteners 111 such that their axes L1, L2 (FIGS. 1 and 2a) intersect each other at an angle α (FIG. 2a) that may be about 90°. In other embodiments, the security apparatus 100 may comprise additional support members depending on the electronic device being secured. The first support member 101 may further comprise a notch 105 or other feature (FIG. 6) that is configured to engage the second support member 110 in order to add additional strength at their junction.

Figure 2:
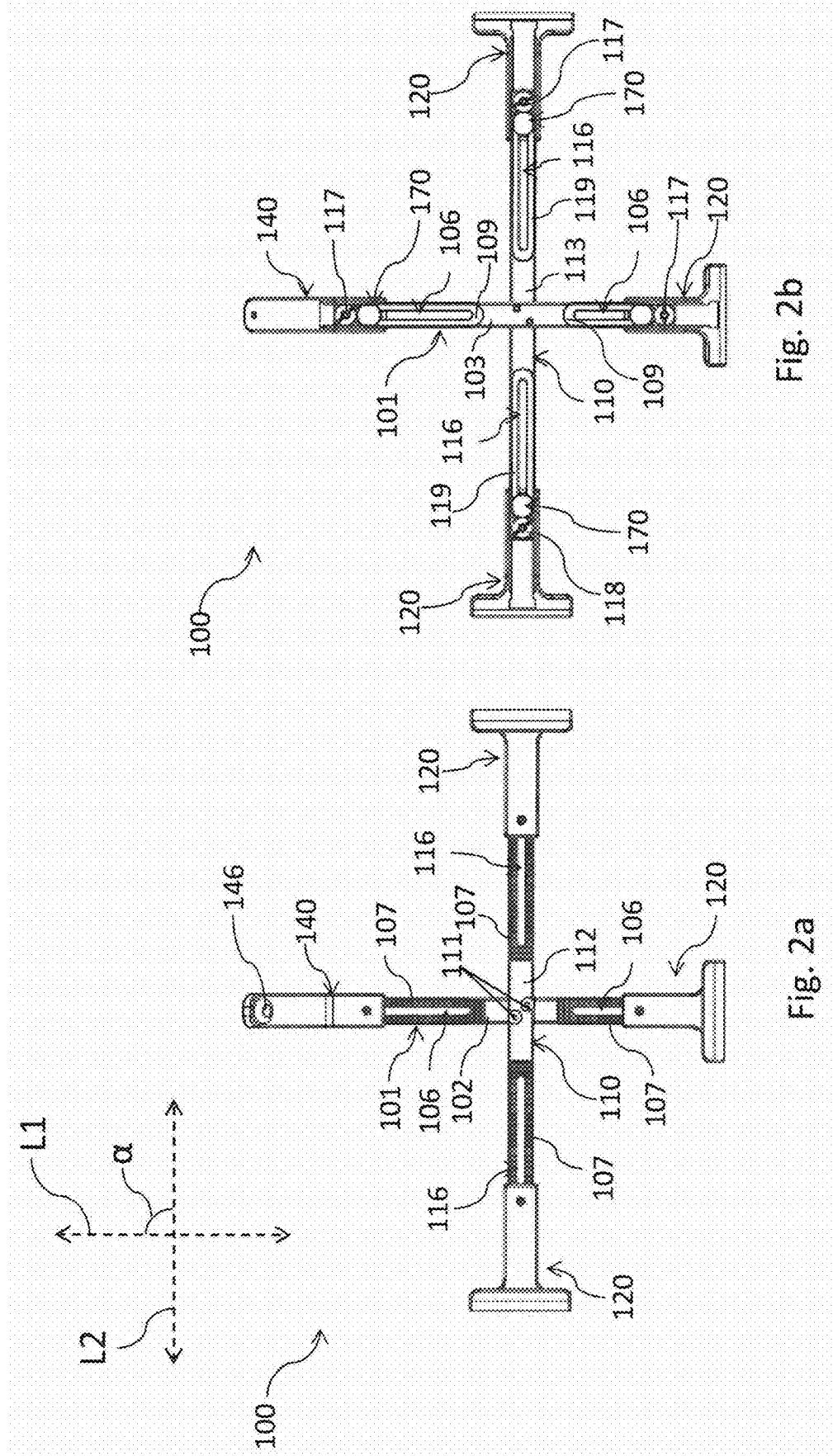
FIG. 2a illustrates a top plan view of an embodiment of the security apparatus.
FIG. 2b illustrates a bottom plan view of an embodiment of the security apparatus.
Figure 3:
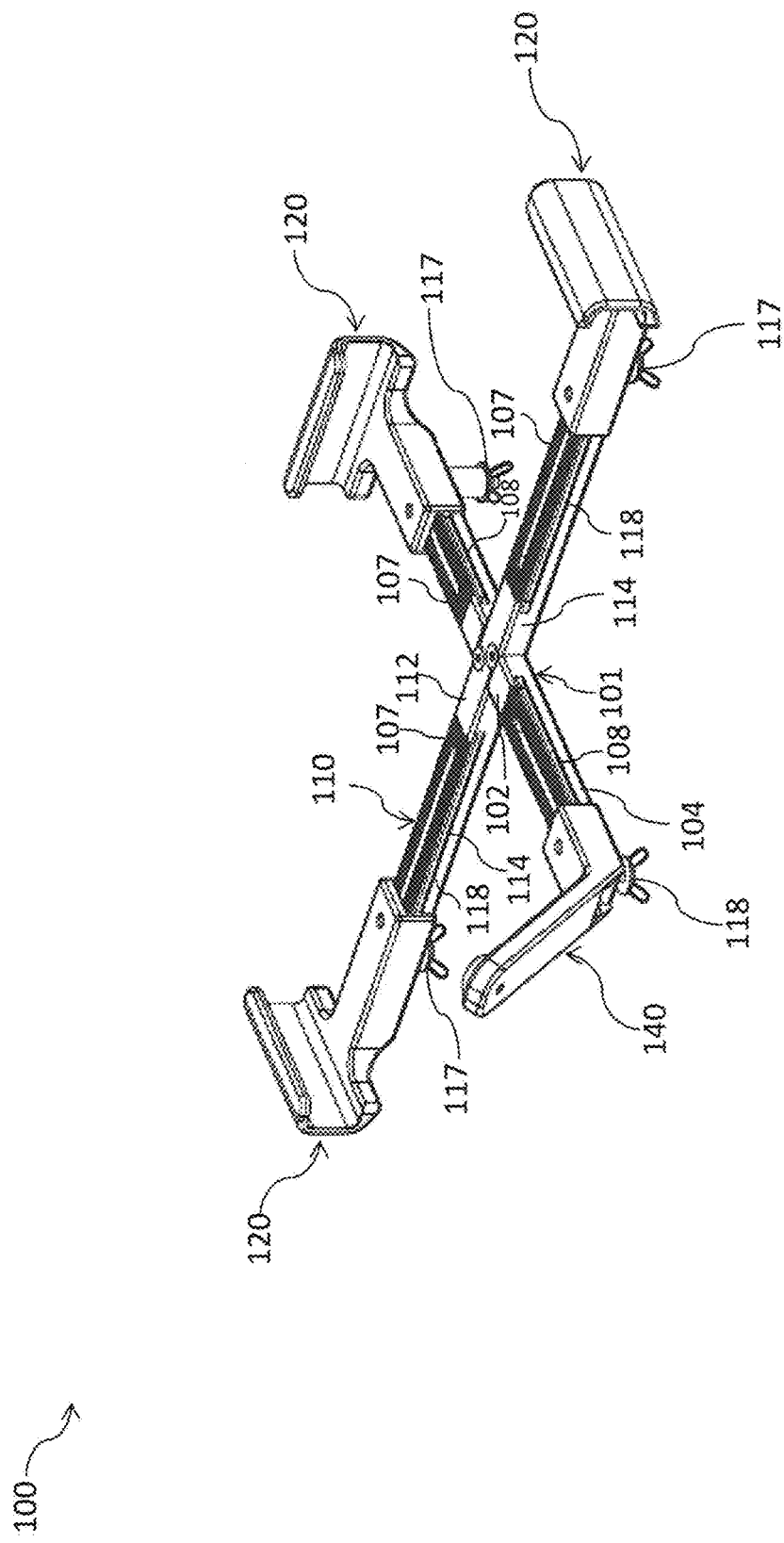
FIG. 3 illustrates a perspective rear view of an embodiment of the security apparatus.
Figure 4:
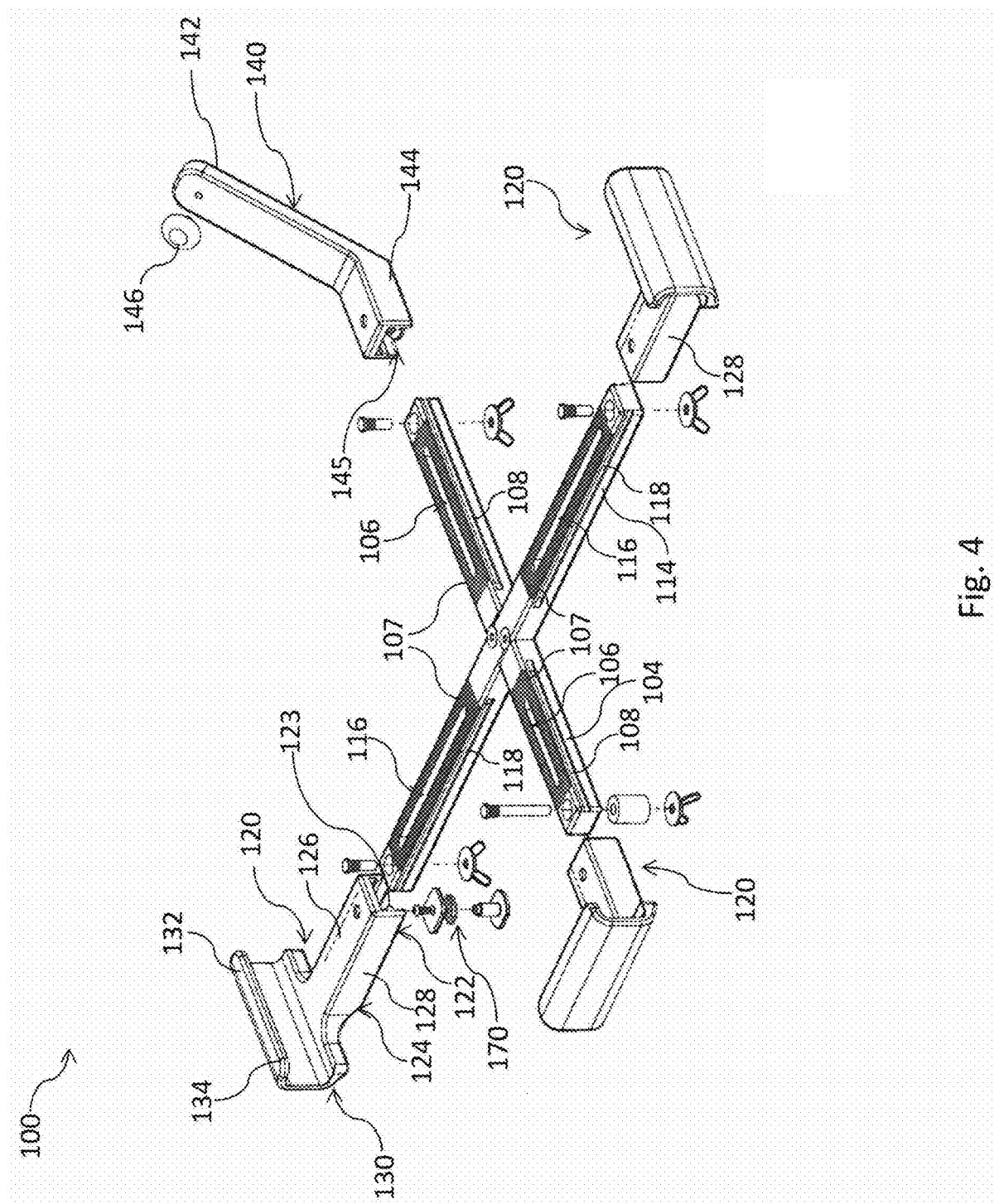
FIG. 4 illustrates an exploded view of an embodiment of the security apparatus.
Figure 5:
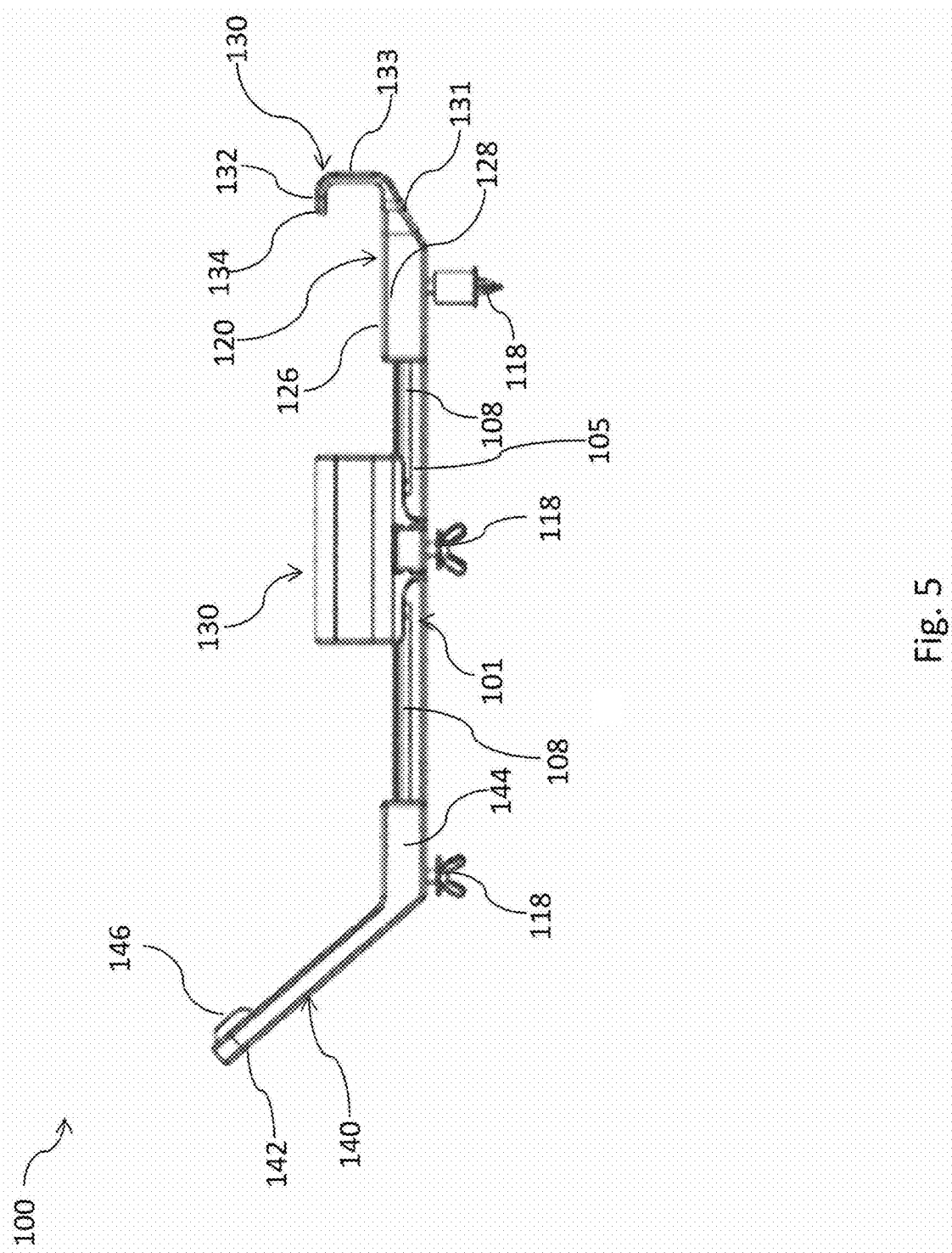
FIG. 5 illustrates a side plan view of an embodiment of the security apparatus.
Figure 6:
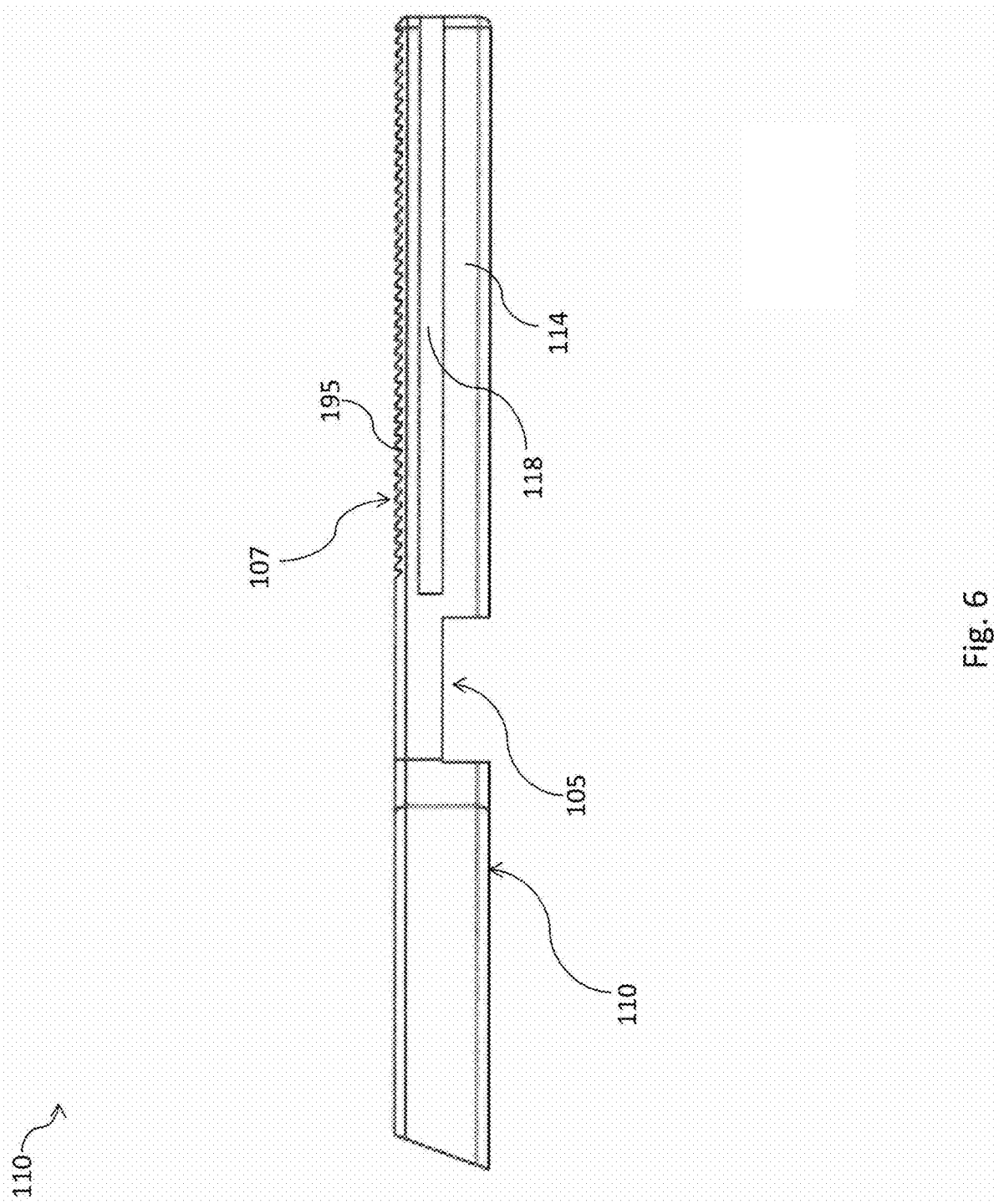
FIG. 6 illustrates a side plan view of an embodiment of a support member of the security apparatus.

As shown in FIGS. 2a-3, the first support member 101 comprises a top surface 102 (FIG. 2a), a bottom surface 103 (FIG. 2b), and side surfaces 104 (FIG. 3). Referring to FIGS. 1-5, one end of the first support member 101 is coupled to an arm 120 and the opposing end is coupled to a stop member 140. As shown in FIGS. 4-5, the stop member 140 comprises a brace 142 that extends from a base member 144. The base member 144 is configured to couple to the first support member 101. As show in FIG. 4, the base member 144 defines an interior space 145 that is configured to at least partially house the first support member 101. In an embodiment, the base member 144 fixedly couples to the first support member 101. The brace 142 may further comprise one or more resilient members 146 configured to engage a portion of a portable electronic device being secured in the security apparatus 100. Similar to the first support member 101, the second support member 110 also comprises a top surface 112, a bottom surface 113 (FIG. 2b), and opposing side surfaces 114. Each end of the second support member 110 may be coupled to an arm 120.

As shown in FIG. 3, each arm 120 generally comprises a top surface 126 and two (2) opposing side surfaces 128. The proximal end 122 of the arm 120 may be positioned closer to the junction of the first support member 101 and the second support member 110. The distal end 124 of the arm 120 comprises a holder 130. The holder 130 comprises a distal end surface 133 that extends above the top surface 126 and is coupled to a cap 132. The cap 132 extends from the top of the distal end surface 133 towards the proximal end 122 of the arm 120 to form a lip 134. The holder may further comprise an end cap 131 (FIG. 5) that also acts to limit the retraction of the arm 120. The holder 130 may be formed as a single unitary component or may be comprised of two (2) or more components joined together using one or more welded joints, fasteners, or any other suitable means to join the components. As shown specifically in FIG. 2b, the arms 120 may be open at the bottom such that a cavity is formed that is defined by the inner surfaces of the top surface 126 and the opposing side surfaces 128. The cavity may be configured to at least partially house a portion of one of the first or the second support members 101, 110. The cavity may also serve to decrease the overall weight of the security apparatus 100.

As shown, the security apparatus 100 comprises three (3) identical or nearly identical arms 120, however in other embodiments, one or more of the arms 120 may vary in its size and/or shape. The arms 120 may be configured to be completely removed or detached from the corresponding first and second support members 101, 110. In this manner, arms 120 of different sizes and shapes may be attached to the support members to fully customize the security apparatus 100.

Referring to FIGS. 2a, 2b, 4 and 7a-8, the first support member and the second support member 101, 110 each define one or more elongated openings 106, 116 that extend between the top surface 102, 112 and the bottom surface 103, 113 (FIGS. 2a-2b) of each of the first and second support member 101, 110. The one or more elongated openings 106, 116 extend a distance along the length of the first support member 101 and the second support member 110. A depression or recess 109, 119 is defined around the perimeter of each elongated opening 106, 116 on the bottom surface 103, 113 of the first and second support members 101, 110.

Figure 7:
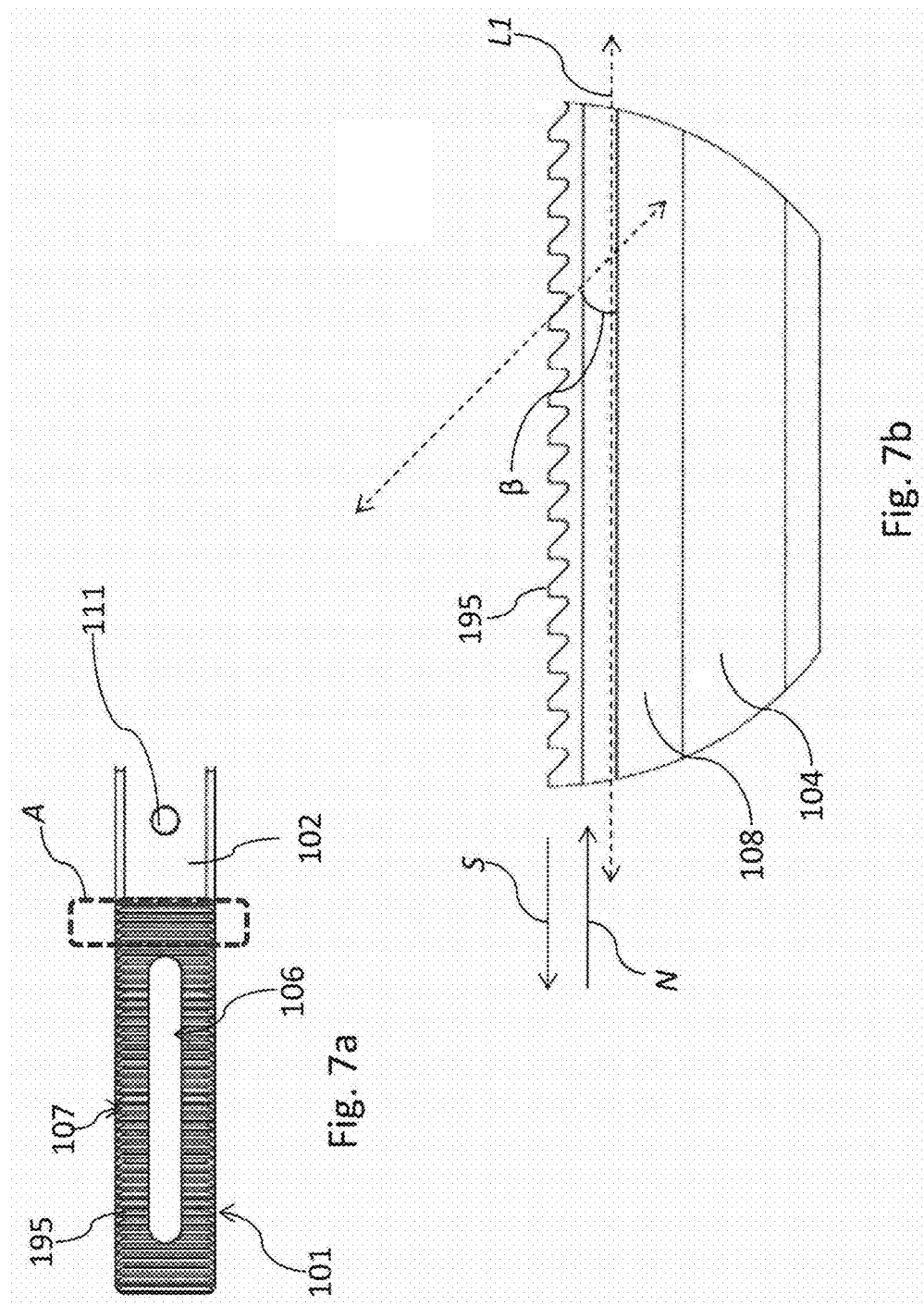

The top surfaces 102, 112 of the first support member 101 and the second support member 110 may further comprise a plurality of support member surface features 107 such as teeth 50. Referring to FIGS. 7a-7b, the teeth 195 may be angled with respect to the axis L1 of the first support member 101 at an angle β that is less than 90°. The teeth 195 of the second support member 110 may also be positioned with respect to the axis L2 (FIG. 2a) of the second support member 110 at an angle equal to β. As shown specifically in FIGS. 6-8, the side surfaces 104 of the first support member 101 and the side surfaces 114 of the second support member 110 comprise a first engagement structure 108, 118. The first engagement structure 108, 118 extends substantially along the length of the first support member 101 and second support member 110. As shown, the first engagement structure 108, 118 may be broken into two or more segments on each side of the first and second support members 101, 110 and may not extend continuously from one end of the first and second support members 101, 110 to the opposing end.

Figure 8:
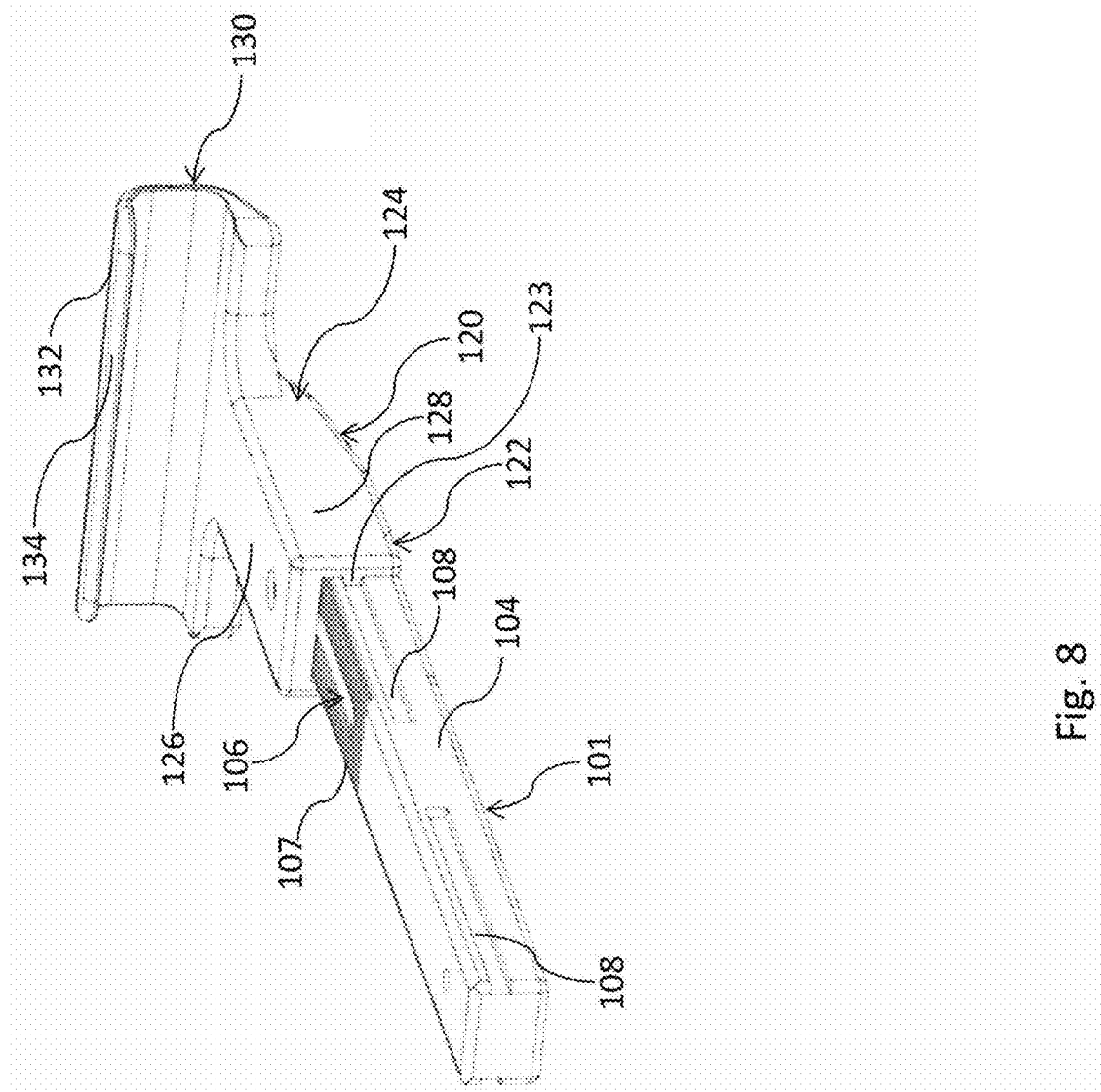
FIG. 8 illustrates a close up view of and embodiment of an arm coupled to a support member of the security apparatus.

Referring to FIG. 8, the arms 120 further comprise a second engagement structure 123 that is configured to fit at least partially within the first engagement structure 108, 118 of the first support member 101. As shown, the first engagement structure 108, 118 is a channel or recess and the second engagement structure 123 is protrusion, however in other embodiments, the first engagement structure 108, 118 is a protrusion and the second engagement structure 123 is channel or recess. As shown with regard to the first support member 101, the second engagement structure 123 is formed on an inner surface of each opposing side surface 128 and may extend along the length of the arm 120. The end of each arm 120 opposing the distal end surface 133 may be open to allow the arm 120 to slide along the length of the first support member 101. The interaction of the first engagement structure 108 and the second engagement structure 123 aid in coupling the arm 120 to the first support member 101 as well as assisting in the sliding action and stability of the arm 120 when coupled to the first support member 101. It will be understood that the second support member 110 also comprises a first engagement structure 118 that is also configured to engage the second engagement structure 123 that is formed on the inner surface of each opposing side surface 128 of the arm 120. The interaction of the second engagement structure 123 and the first engagement structure 118 of the second support member 110 may have similar advantages to those described above with regard to the first support member 101.

Figure 9:
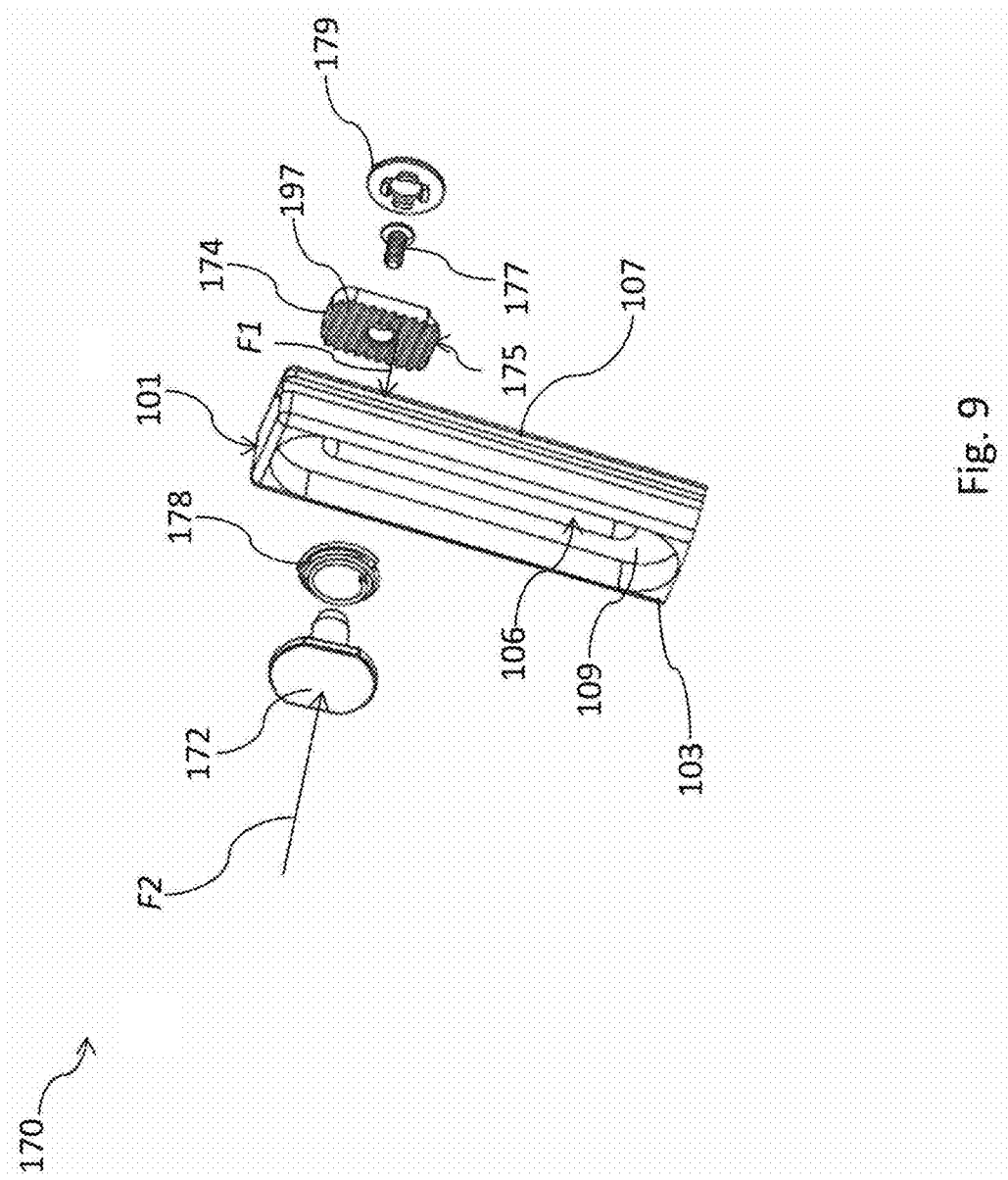
FIG. 9 illustrates an exploded view of an embodiment of a lock assembly of the security apparatus.

The arms 120 may further be coupled to the first and second support members 101, 110 using one or more lock assemblies 170 (FIGS. 2b, 4, and 9). Each lock assembly 170 is configured to restrain or prevent the sliding movement of the arm 120 in one direction when in a locked position and allow the arm 120 to slide freely along the first and second support member 101, 110 when in an unlocked position.

As shown in FIG. 9, the lock assembly 170 is a push-button assembly, however in other embodiments the lock assembly 170 may not be a push-button assembly. The lock assembly 170 will be described with regards to its interaction with the first support member 101 as shown in FIG. 9, however it will be understood that the lock assembly 170 would also interact in a similar manner with the second support member 110 as it has been described above. As shown in FIGS. 7a-b, and 9, the lock assembly 170 comprises a depression plate 172 coupled to one end of a push rod 177 and a backing 179 that engages an opposing end of the push rod 177. An engagement plate 174 is positioned between the backing 179 and the first support member 101. In an embodiment, the backing 179 and the push rod 177 may be formed as a single component. As shown, the push rod 177 traverses the arm 120 and extends through the elongated opening 106 of the first support member 101. The engagement plate 174 comprises a plurality of lock surface features 175 that are complimentary to the support member surface features 107. As shown, the lock surface features 175 are complimentary teeth 197 that are configured to engage or interact with the teeth 195 on the top surface 102 of the first support member 101. A spring or resilient member 178 may surround part of and/or contact a portion of the depression plate 172 and be positioned between the depression plate 172 and the recess 109 to prevent over-depression of the depression plate. In an embodiment, the resilient member or spring 178 may be housed within the push rod 177. In the resting or decompressed state, the spring 178 may act to exert a force F1 against the depression plate 172, which in turn acts to bring the lock surface features 175 of the engagement plate 174 into engagement with the support member surface features 107 of the second support member 110. When the support member surface features 107 and the lock surface features 175 are engaged, the sliding movement of the arm 120 along the first support member 101 is permitted in a first direction S, but not in a second direction. As shown in FIG. 7b, when the support member surface features 107 and the lock surface features 175 are teeth, the angle β of the teeth 195 allows the arm 120 to slide in a first direction S toward the proximal end 122 when engaged with the complimentary teeth 197, but prevents the arm 120 from sliding in a second direction N toward the distal end 124. Applying a force F2 (FIG. 9) to depress the depression plate 172 results in the disengagement of the lock surface features 175 from the support member surface features 107. This disengagement allows the arm 120 slide freely along the first support member 101 in both the first S and second directions N.

In order to secure a portable electronic device (not shown), such as a laptop computer, the depression plate 172 of each arm 120 is depressed and the arms 120 are moved in a second direction N toward their distal ends 124 (FIG. 4). The portable electronic device (not shown) may be placed onto the security apparatus 100 such that it at least partially contacts the top surfaces 102, 112 of the first support member 101 and the second support member 110, respectively. The arms 120 are slid in a first direction S (FIG. 7b) toward the portable electronic device (not shown) until a portion of the portable electronic device (not shown) is positioned under the lip 134 of each arm 120 and/or the inner side of the distal end surface 133 is proximate to or in contact with the portable electronic device (not shown). The security apparatus 100 containing the portable electronic device is then secured to a display surface (not shown) using one or more anchors 117. As shown, the one or more anchors 117 are threaded bolts or screws that may be secured to the display surface (not shown) using a nut, however in other embodiments the one or more anchors 117 may be any hardware suitable to securely fasten the security apparatus 100 to the display surface (not shown).

When the security apparatus 100 is anchored to the display surface (not shown), the lock assemblies 170, and specifically the depression plates 172 are not accessible and the lock surface features 175 of the engagement plate 174 remain engaged with the support member surface features 107 of the first and second support members 101, 110. In this state, the arms 120 can only be advanced in the first direction S (FIG. 7b) toward the portable electronic device (not shown). When the portable electronic device (not shown) is locked into the security apparatus 100, the restricted movement of the arms 120 and the holders 130, as well as the stop member 140 act to prevent removal of the portable electronic device (not shown) from the security apparatus 100. In order to release the portable electronic device (not shown) from the security apparatus 100, the security apparatus 100 must be detached from the display surface (not shown) so that the push-button assemblies 170 become accessible. The depression plate 172 can then be pushed down by a force F2 to disengage the engagement plate 174 (and thereby, the lock surface features 175) from the support member surface features 107. The arm(s) 120 may then be slid away from the portable electronic device or in the second direction N away from the portable electronic device (not shown). The portable electronic device (not shown) may then be removed and another portable electronic device may be placed in the security apparatus 100. In an embodiment, a wireless charger may be coupled to the top surfaces 102, 112 of the first and second support members 101, 110.

In another embodiment, the stop member 140 may be configured to accept a supplemental security piece comprising one or more additional support members that have similar features to the previously described first and second support members 101, 110. In this embodiment, the security apparatus 100 would be capable is securing the keyboard portion and the display portion of a laptop computer.

Figure 16:
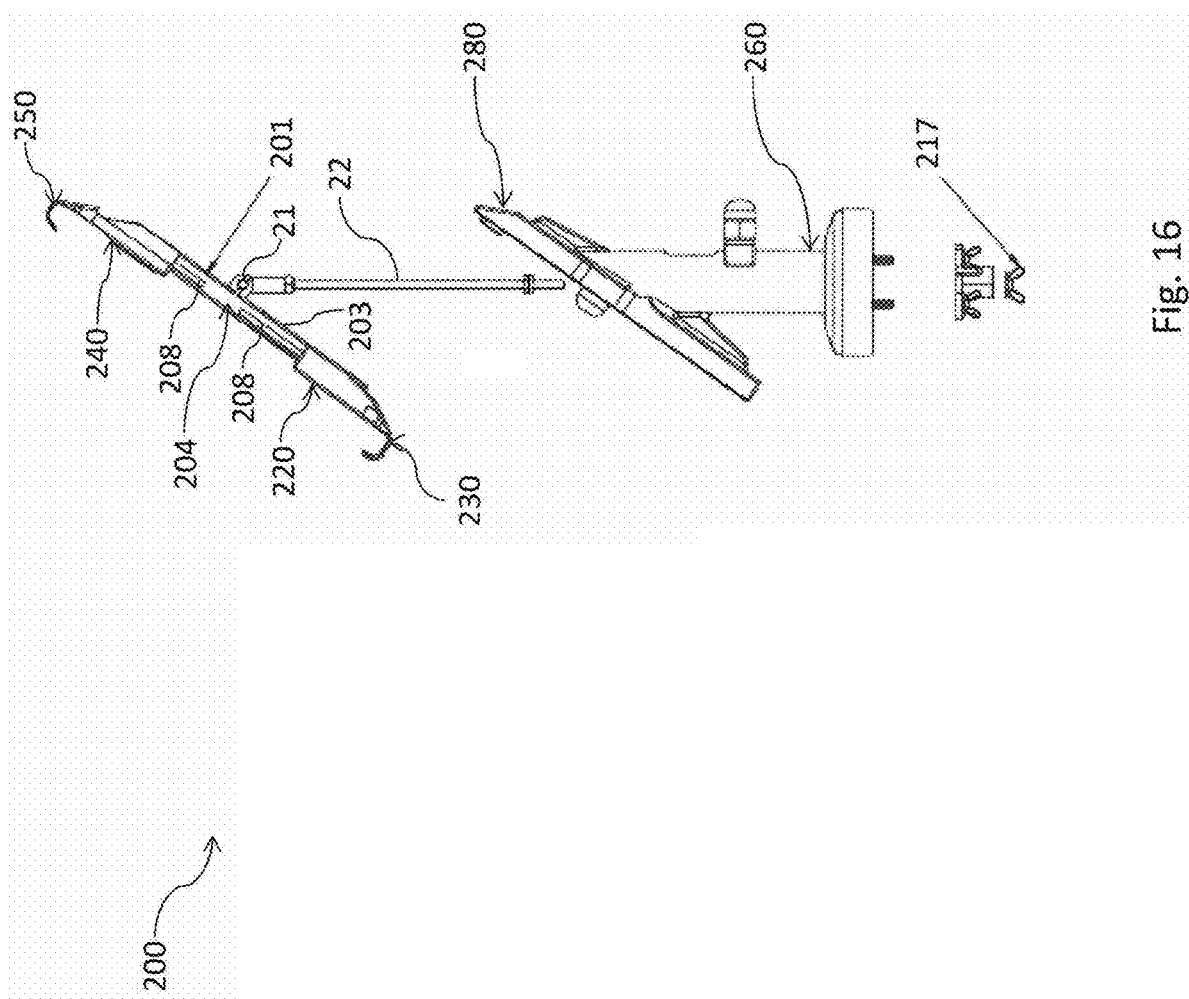
FIG. 16 is a partially exploded view of an embodiment of the security apparatus.

Referring to FIGS. 10-17, another embodiment of the security apparatus 200 comprises a support member 201 coupled to a first arm 220 at one end and a second arm 240 at the opposing end. Similar to the embodiment of the security apparatus 100 previously described, the support member 201 comprises a top surface 202, opposing side surfaces 204, and a bottom surface 203 (FIG. 16). At least one of the opposing side surfaces 204 defines a first engagement structure 223. As shown, the first engagement structure 208 is a channel or recess and the second engagement structure 223 is protrusion, however in other embodiments, the first engagement structure 208 is a protrusion and the second engagement structure 223 is channel or recess. The support member 201 may generally extend from one end to an opposing end along an axis. At least one end of the support member 201 defines a plurality of support member surface features 207 and an elongated opening 206 extending from the top surface 202 of the support member 201 to the bottom surface 203 (FIG. 16). As shown, the support member surface features may be teeth 295 that are configured to function similar to those previously described, however in other embodiments the support member surface features 107 may be any other suitable surface feature such as grooves, ridges, or depressions.

Figure 17:
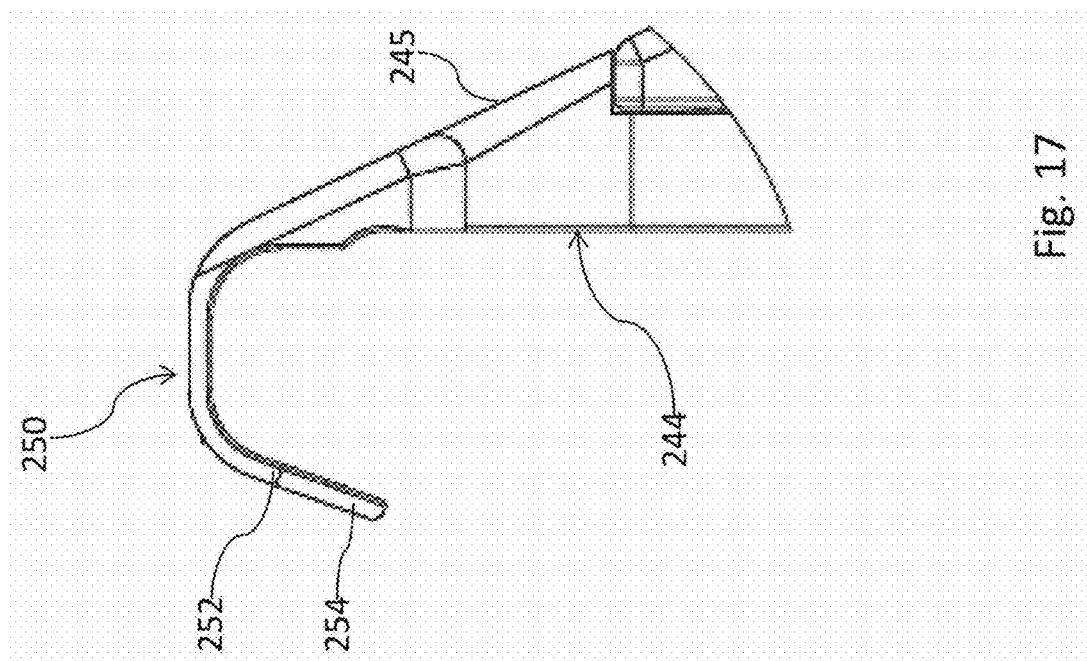
FIG. 17 illustrates a side plan view of an embodiment of a holder of the security apparatus.

The first arm 220 and the second arm 240 generally comprise a top surface 226, 246 and two (2) opposing side surfaces 228, 248 where at least one of the two (2) opposing side surfaces 228, 248 defines a second engagement structure 223 that is configured to slidably engage the first engagement structure 208. The proximal ends 222, 242 of each arm 220, 240 face each other. The distal ends 224, 244 of each of the first arm 220 and the second arm 240 comprise a holder 230, 250. The first holder 230 comprises a distal end surface 233 that extends above the top surface 226 of the first arm 220 and is coupled to a cap 232. The cap 232 extends from the top of the distal end surface 233 towards the proximal end 222 of the arm 220 to form a lip 234. Similarly, and as shown in FIG. 17, the second holder 250 comprises a distal end surface 253 that extends above the top surface 246 of the second arm 240 and is coupled to a cap 252. The cap 252 extends from the top of the distal end surface 253 towards the proximal end 242 of the second arm 240 to form a lip 254. One or more components of the holders 230, 250 may be formed as a single component. As shown, the holder 250 of the second arm 240 extends a greater distance between opposing ends than does the holder 230 of the first arm 220. The first arm 220 and the second arm 240 may be open at the bottom such that a cavity is formed that is defined by the inner surfaces of the top surface 226, 246 and the opposing side surfaces 228, 248. The cavity may be configured to at least partially house a portion of the support member 201. The cavity may also serve to decrease the overall weight of the security apparatus 200.

Figure 10:
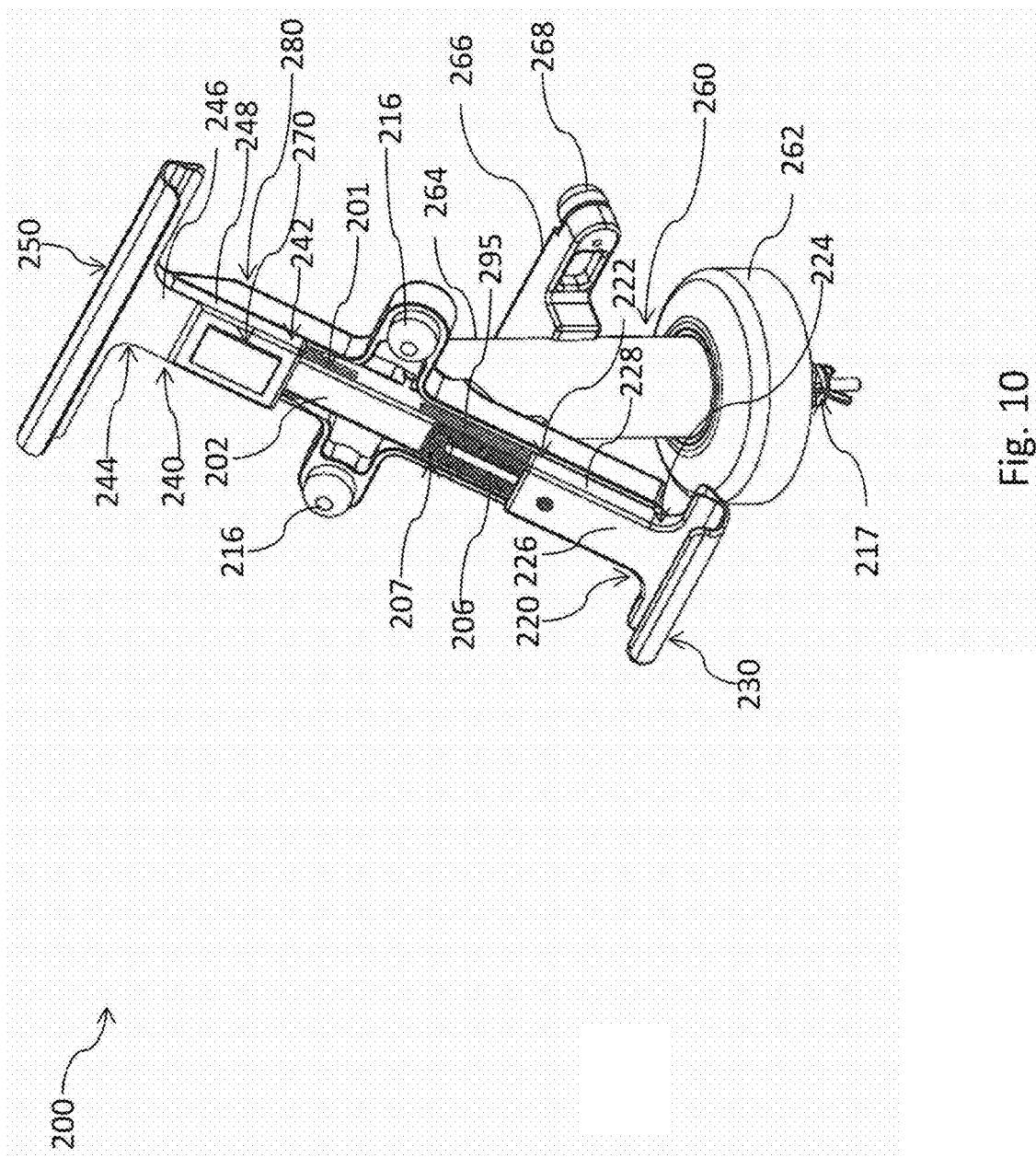
FIG. 10 illustrates a front perspective view of another embodiment of the security apparatus.
Figure 14:
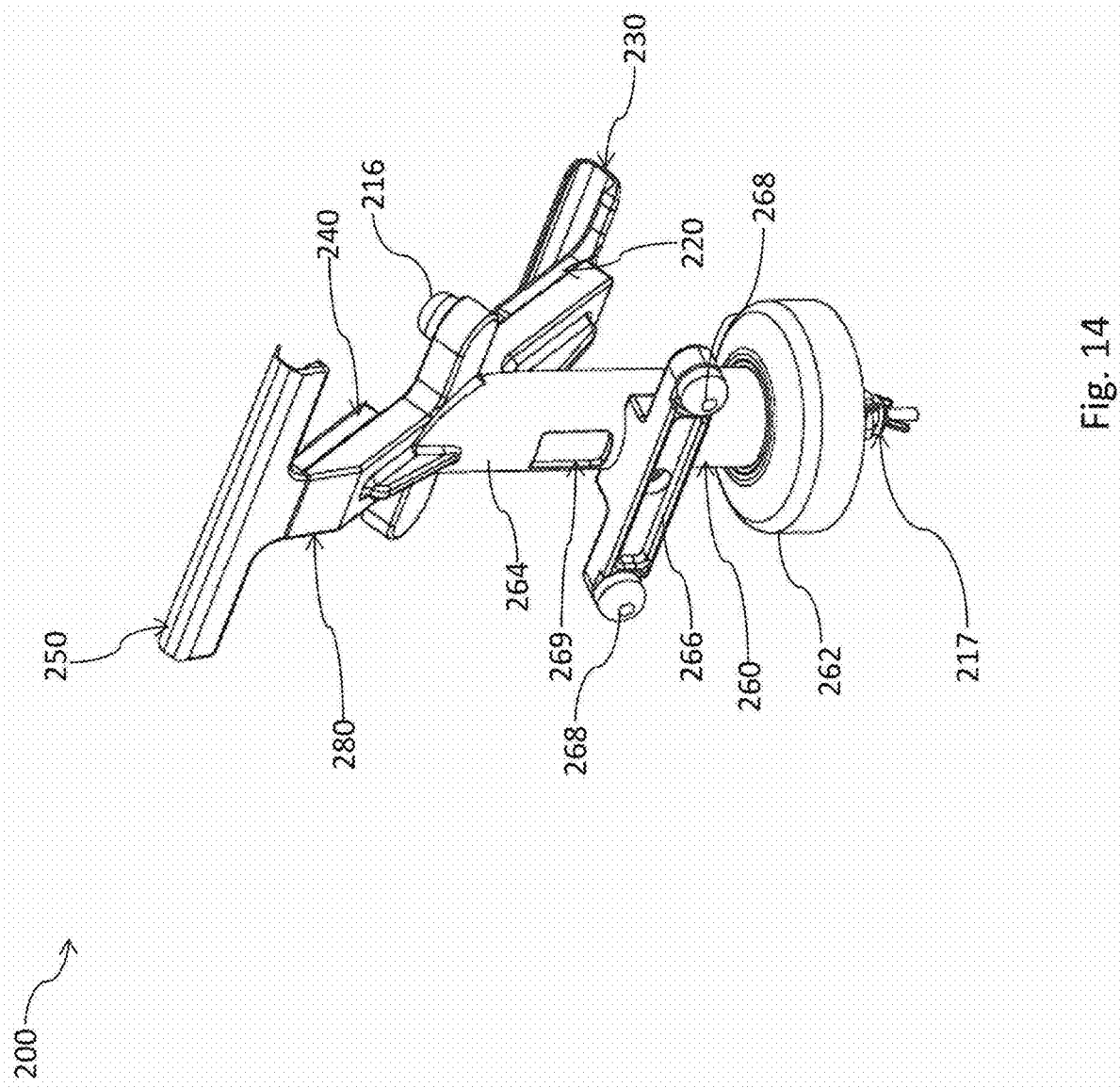
FIG. 14 illustrates a rear perspective view of an embodiment of the security apparatus.
Figure 15:
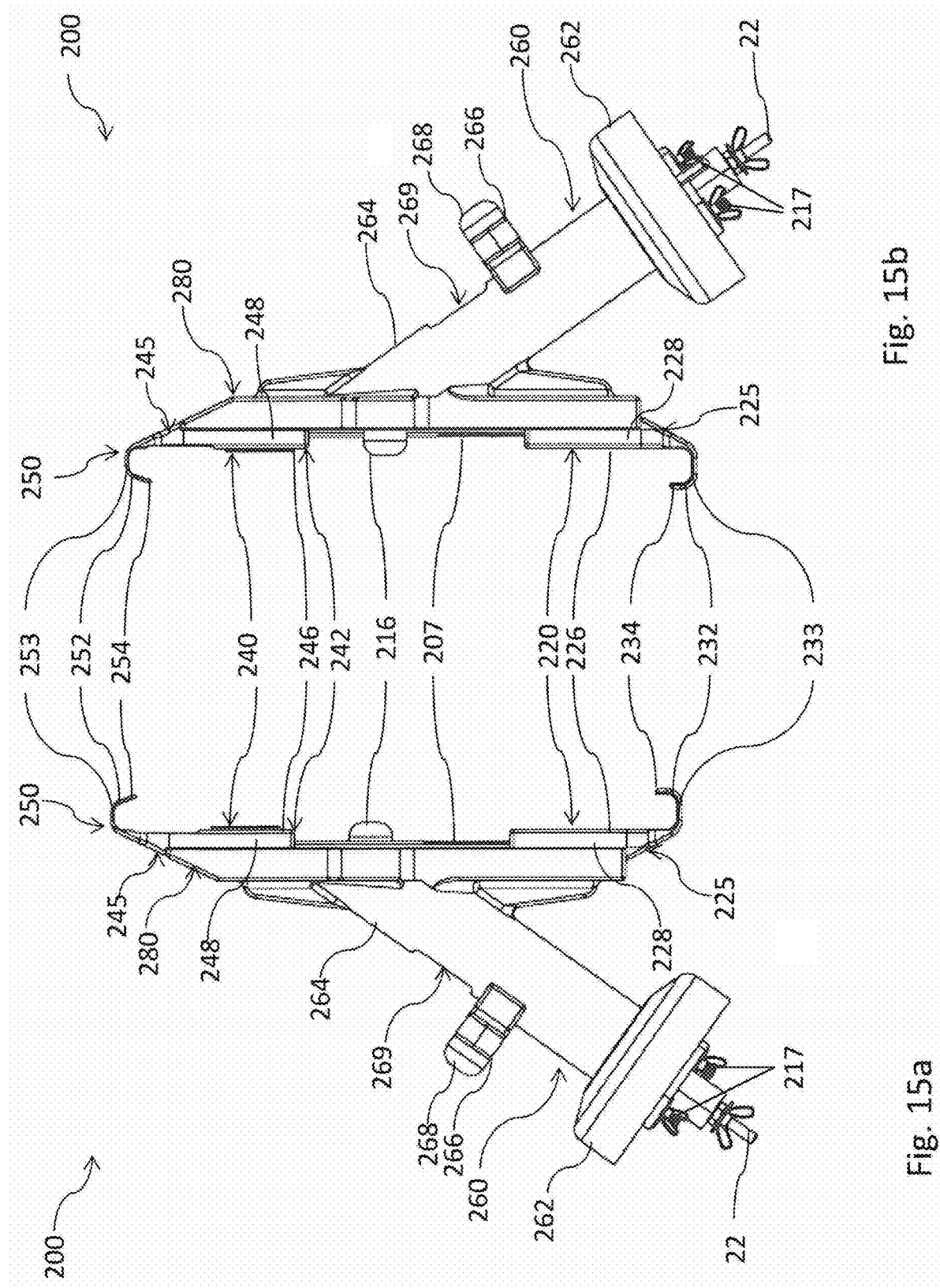
FIG. 15a illustrates a right side plan view of an embodiment of the security apparatus.
FIG. 15b illustrates a left side plan view of an embodiment of the security apparatus.

Each of the first arm 220 and the second arm 240 is configured to engage and slide along one or more first engagement structures 208 (FIG. 16) that extend along the opposing side surfaces 204 of the support member 201. The first arm 220 may further comprise an end cap 225 configured to limit the retraction of the second arm 220. The second arm 240 may further comprise an end cap 245 configured to limit the retraction of the second arm 240. Similar to the previously disclosed embodiments, at least one arm may further be coupled to the support members 201 using one or more lock assemblies 270. As shown in FIG. 10, the second arm 240 is coupled to the support member 201 via a lock assembly 270. The lock assembly 270 comprises a plurality of lock surface features that are configured to prevent sliding movement of the second arm 240 in the second direction N when in a locked position, and to allow the second arm 240 to slide freely along the support member 201 when in an unlocked position. The lock assembly 270 and the interaction of the lock surface features with the support member surface features 207 operates in a similar manner to the embodiments of the lock assembly previously described.

Referring to FIG. 16, the support member 201 is coupled to a rod 22 at a connection point 21. The support member 201 with the arms 220, 240 coupled to it is seated within a housing 280 that is positioned on a pedestal 260. The pedestal 260 comprises a central bore (not shown) that is configured to accept the rod 22 when the support member 201 is seated in the housing 280. The housing 280 may further comprise one or more stabilizing elements 216 configured to support the portable electronic device being secured in the security apparatus 200. Placing the support member 201 within the housing 280 prevents the unlocking of the locking assembly 270.

The pedestal 260 further comprises a base portion 262 (FIGS. 13a-13b) and a stem portion 264 (FIGS. 13a-13b). The stem portion 264 may further comprise one or more additional stabilizing elements 266, 268 (FIGS. 10, 14) and may also define an opening 269 (FIG. 14) configured to provide access to electrical components within the pedestal 260 or an additional locking mechanism. In an embodiment, the housing 280 and the pedestal 260 may be formed as a single component. In another embodiment, the security apparatus 200 may comprise a wireless charger.

In order to assemble the security apparatus 200, the first arm 220 and the second arm 240 are extended along the support member 201 by unlocking the locking assembly 270. The support member 201 is then placed into the housing 280 with the rod 22 extending through the pedestal 260. The security apparatus 200 is then secured to a display surface (not shown) via mounts 217 positioned on the base portion 262 of the pedestal 260. As shown, the mounts 217 are bolts secured with wing nuts. Referring to FIGS. 13a-b and 15a-b, the rod 22 is configured to extend through or traverse the display surface (not shown) and be secured to the underside of the display surface (not shown) so that the support member 201 cannot be separated from the housing 280. The portable electronic device 290 may be placed against the support member 201 and the stabilizing elements 216. Referring to FIGS. 11a-13b, the portable electronic device 290 may be a laptop, The second arm 240 is then pushed towards the portable electronic device 290 in the first direction S (FIG. 7b) until it traps a portion of the portable electronic device 290 under the lip 254 and secures the portable electronic device 290 between the first holder 230 and the second holder 250. As previously described, interaction between the support member surface features 207 and the lock surface features may allow the arms 220, 240 to be slid towards each other a first direction S (FIG. 7b), but prevent them from being able to be moved away from each other in a second direction N (FIG. 7b) as has been previously described. The housing 280 prevents access to the lock assembly 270 such that the portable electronic device 290 is secured in the security apparatus 200. Referring to FIG. 11b, the dimensions of the second holder 250 allow it to engage a keyboard portion 292 of the portable electronic device 290 between a pair of hinges 296 that couple the keyboard portion 292 to the display portion 294. In this manner, the portable electronic device 290 cannot be removed from the security device 200 unless the rod 20 is uncoupled from the display surface (not shown) so that the lock assembly 270 can be unlocked.

Figure 24:
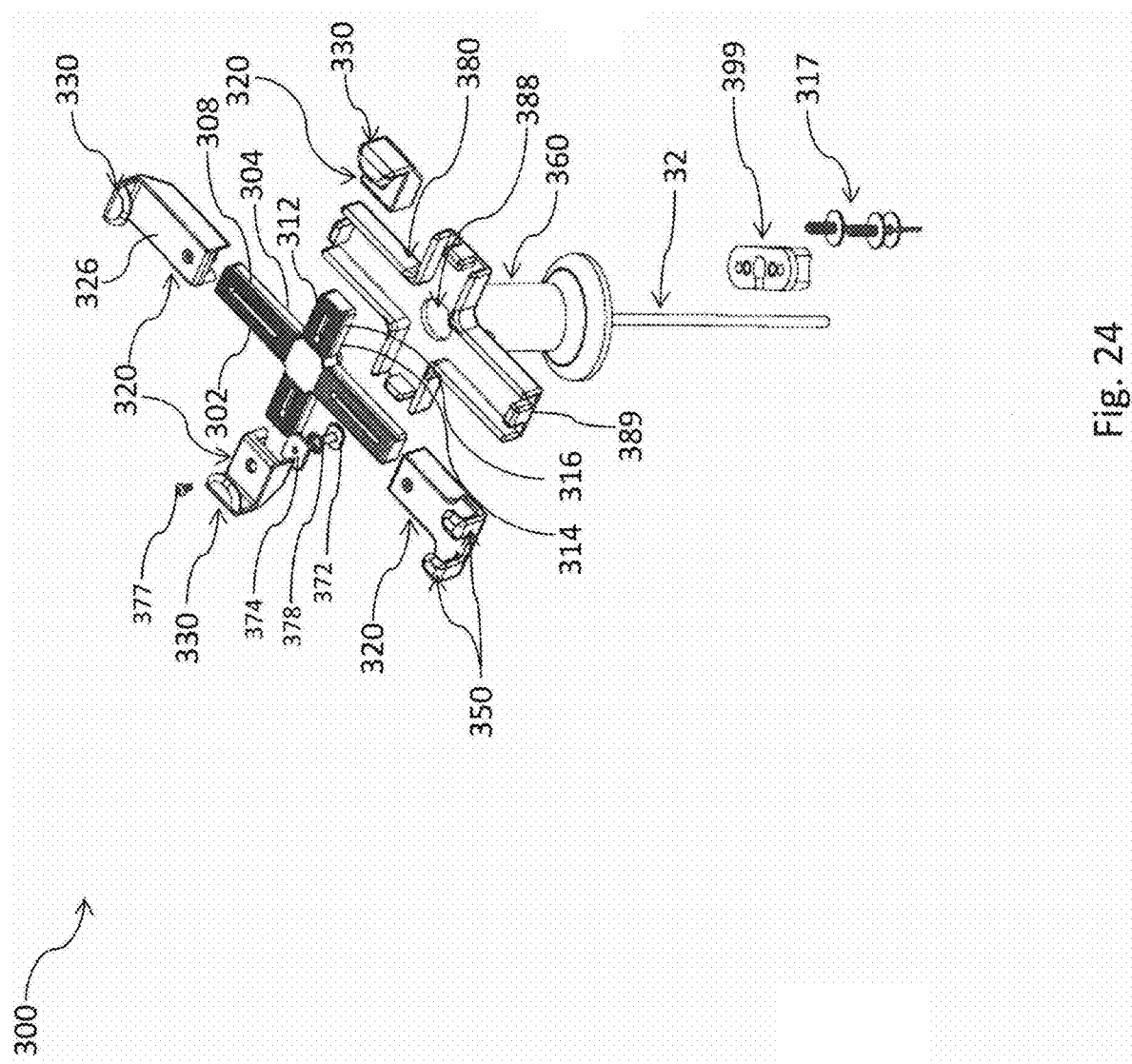
FIG. 24 illustrates an exploded view of an embodiment of the security apparatus.
Figure 25:
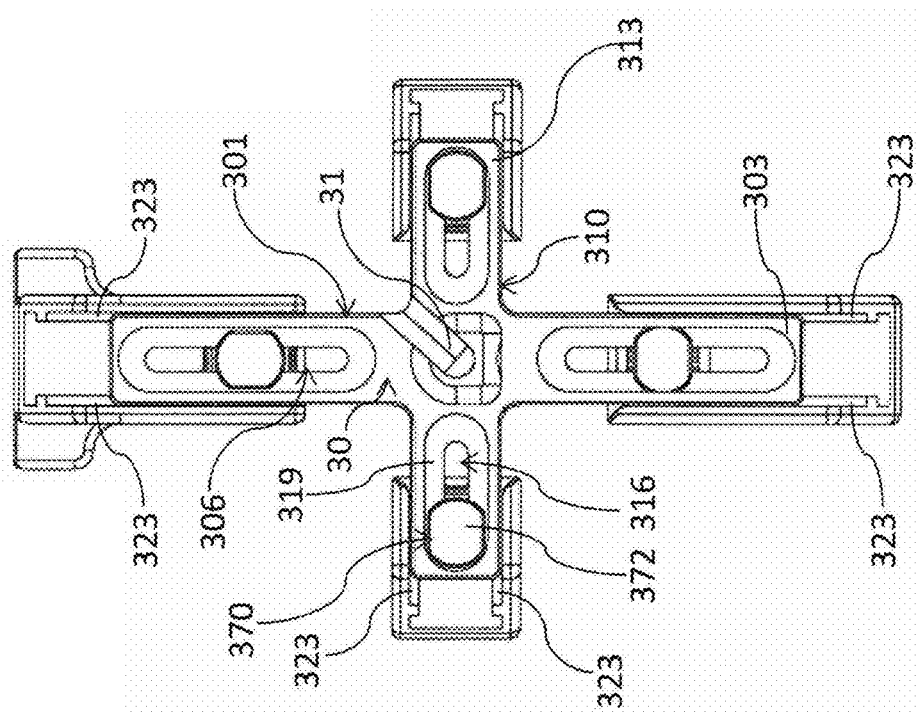
FIG. 25 illustrates a bottom plan view of a portion of an embodiment of the security apparatus showing a bottom side of the lock assemblies.

In another embodiment shown in FIGS. 18-26, the security apparatus 300 comprises a first support member 301 and a second support member 310. Referring to FIGS. 24-25, the first and second support members 301, 310 comprise a top surface 302, 312, opposing side surfaces 304, 314, and a bottom surface 303, 313. The top surface 302, 312 of the first support member 301 and the second support member 310 define a plurality of support member surface features 307 and two (2) elongated openings 306, 316 extending from the top surface 302, 312 to the bottom surface 303, 313 of the first and second support members 301, 310. As shown, the support member surface features are teeth 395 that are configured and function similar to those previously described in other embodiments. Similar to the embodiments previously described, the opposing side surfaces 304, 314 of the first and second support members 301, 310 define a first engagement structure 308, 318.

Figure 20:
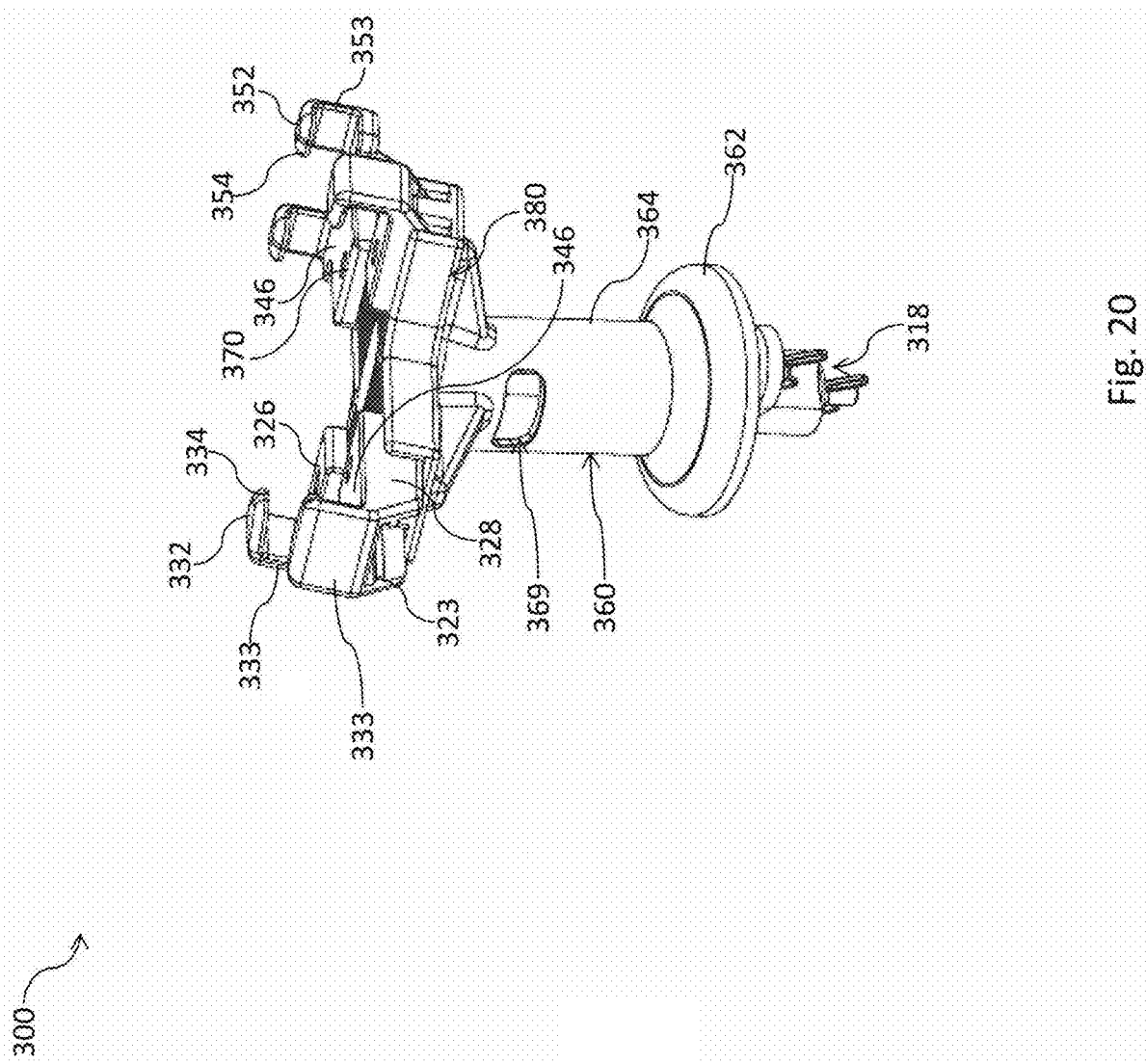
FIG. 20 illustrates a rear perspective view of an embodiment of the security apparatus.
Figure 21:
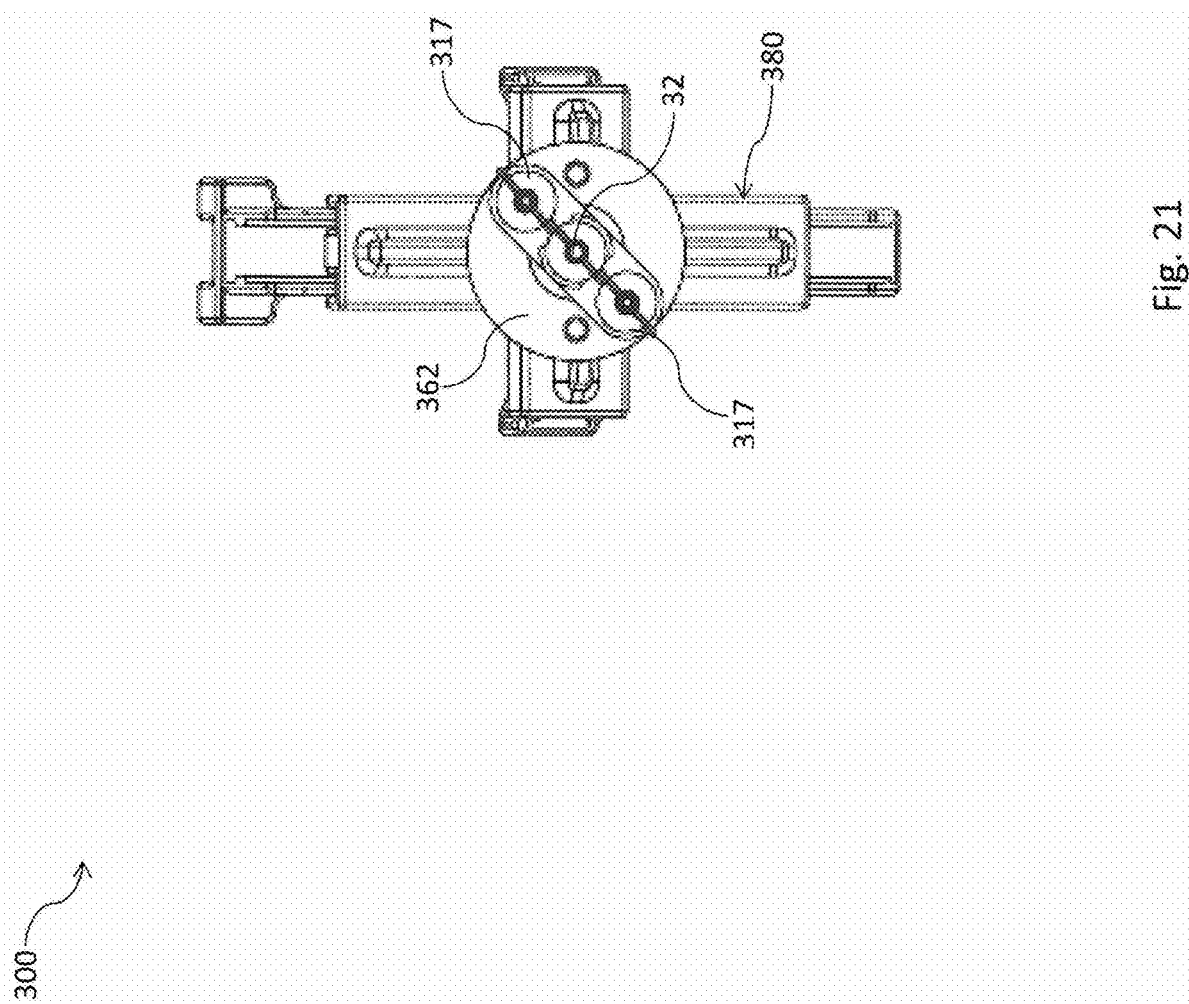
FIG. 21 illustrates a bottom plan view of an embodiment of the security apparatus.
Figure 22:
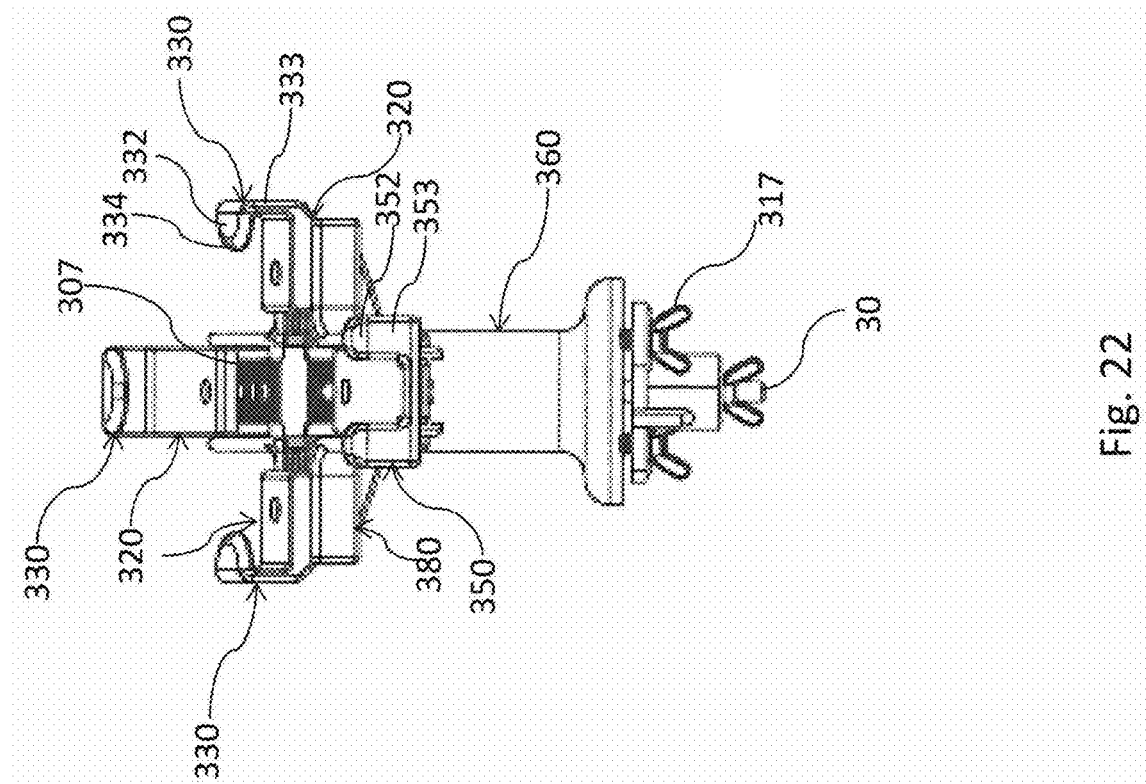
FIG. 22 illustrates a front perspective view of an embodiment of the security apparatus.
Figure 23:
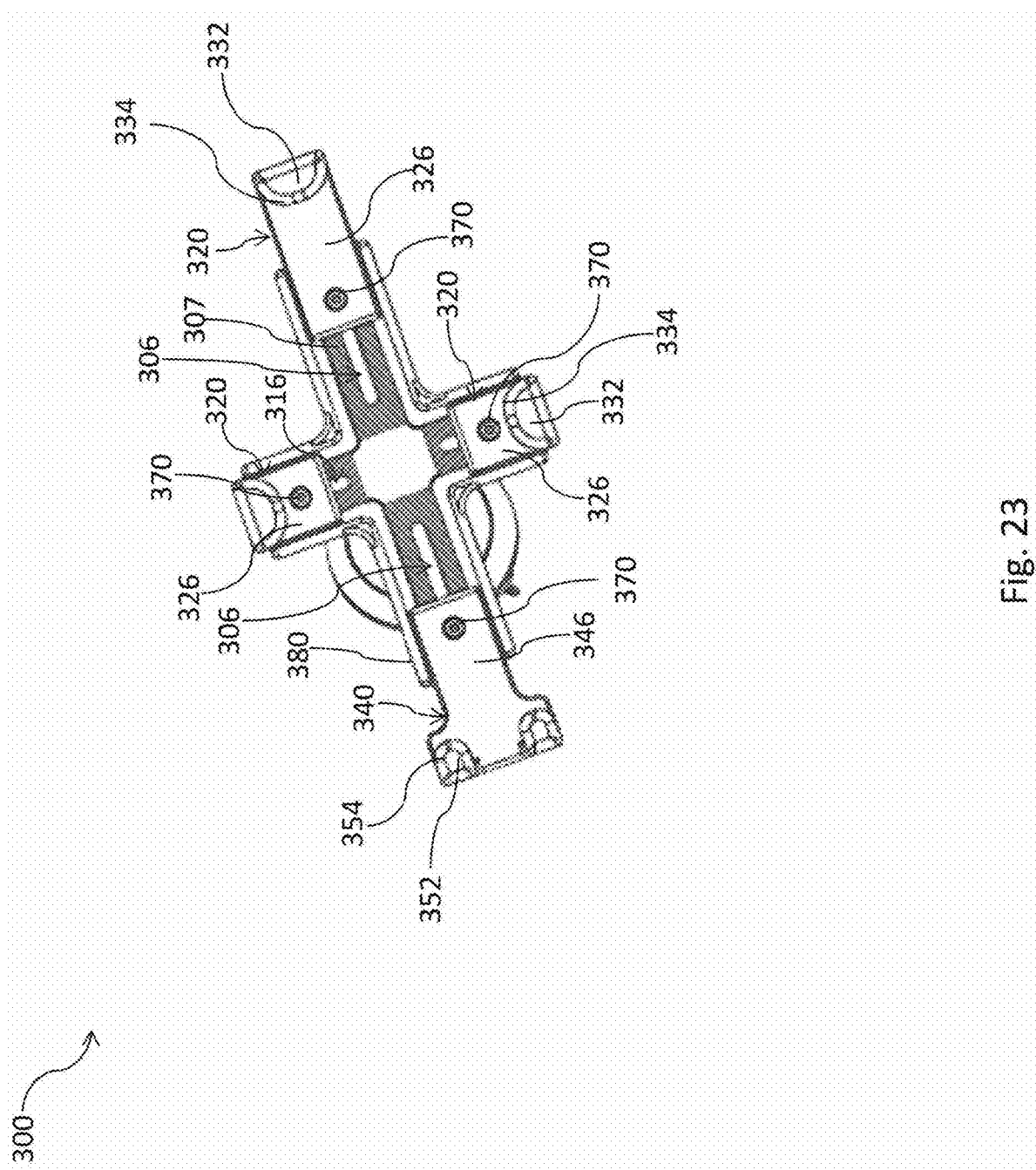
FIG. 23 illustrates a top plan view of an embodiment of the security apparatus.
Figure 26:
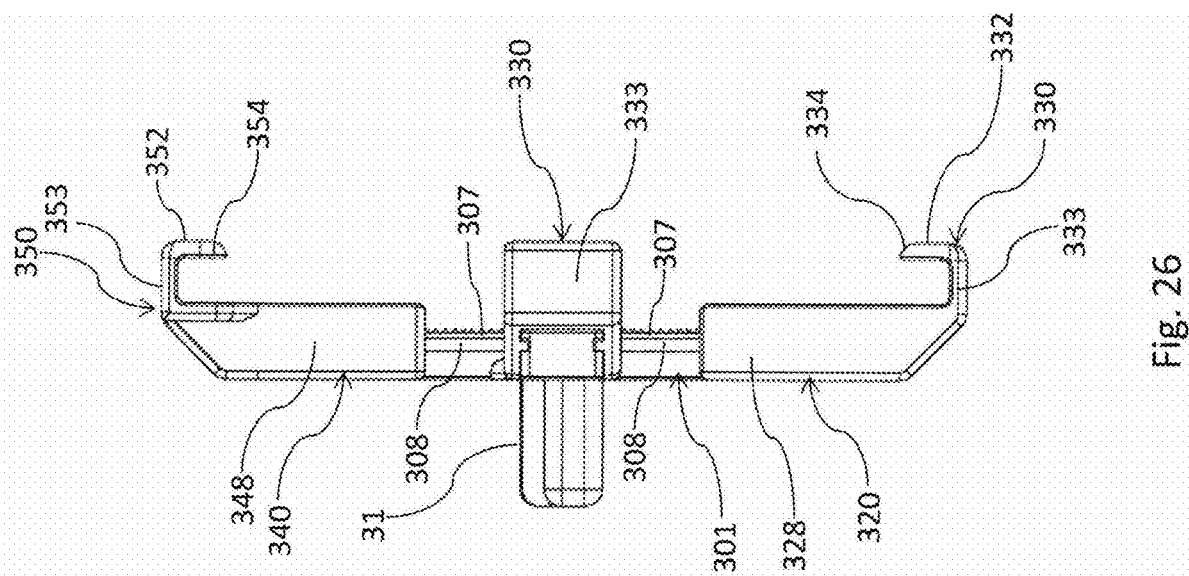
FIG. 26 illustrates a right side plan view of an embodiment of the security apparatus.

As shown, the first support member 301 is coupled to an arm 320 at one end and a split arm 340 at an opposing end. The second support member 310 is coupled to an arm 320 at each end. As shown specifically in FIG. 19, the arms 320 may be of a different size, however their configuration is otherwise identical. The arms 320 and the split arm 340 generally comprise a top surface 326, 346 and two (2) opposing side surfaces 328, 348. Referring to FIG. 20, the opposing side surfaces 328 of the arm 320 further define a second engagement structure 323. As shown, the first engagement structure 308, 318 is a channel or recess and the second engagement structure 323 is protrusion, however in other embodiments, the first engagement structure 308, 318 is a protrusion and the second engagement structure 323 is channel or recess. It will be understood that one or more of the other arms 320 and the split arm 340 may also comprise a similar second engagement structure 323. The distal ends of each arm 320, 340 comprise a holder 330, 350. Referring specifically to FIG. 26, the holders 330, 350 comprise a distal end surface 333, 353 that extends above the top surface 326, 346 of the arm 320, 340 and is coupled to a cap 332, 352. The cap 332, 352 extends from the top of the distal end surface 333, 353 towards the opposing end of the arm 320, 340 to form a lip 334, 354. As shown in FIGS. 18-19 and 22-24, the split arm 340 comprises two identical holders 350. The arms 320 and the split arm 340 may be open at the bottom such that a cavity is formed that is defined by the inner surfaces of the top surface 326, 346 and the opposing side surfaces 328, 348. The cavity may be configured to at least partially house a portion of the first and second support members 301, 310, respectively. The cavity may also serve to decrease the overall weight of the security apparatus 300.

The second engagement structure 323 of each arm 320, 340 is configured to engage and slide along the first engagement structures 308, 318 that extend along the opposing side surfaces 304, 314 of the first and second support members 301, 310. Similar to the previous embodiments described and as shown in FIGS. 24-25 the arms 320 and the split arm 340 may further be coupled to their corresponding support member using one or more lock assemblies 370. Still referring to FIGS. 24-25, the lock assembly 370 is a push-button assembly, however in other embodiments, the lock assembly 370 may not be a push-button assembly. The lock assembly 370 operates in a similar manner to previously described embodiments of a lock assembly. The lock assembly 370 will be additionally described with regards to its interaction with the second support member 310 as shown in FIGS. 24-25, however it will be understood that the lock assembly 370 would also interact in a similar manner with the first support member 301.

The lock assembly 370 comprises a depression plate 372 and an engagement plate 374. A push rod 377 is coupled to the depression plate 372 at one end and the engagement plate 374 is positioned between the push rod 377 and the second support member 310. As shown, the push rod 377 traverses the arm 320 and extends through the opening 316 of the second support member 310. The engagement plate 374 comprises a plurality of lock surface features that are complimentary to the support member surface features 307. The lock surface features are configured to engage with the support member surface features 307 on the top surface 312 of the second support member 310. A spring or resilient member 378 may surround part or and/or contact a portion of the depression plate 372 and be positioned between the depression plate 372 and the recess 319 to prevent over-depression of the depression plate 372. As described, the lock assembly 370 functions in a manner similar to that of the previously discussed embodiments (100, 200). When support member surface features 307 and the lock surface features are engaged, the sliding movement of the arm 320 with respect to the second support member 310 is permitted in the first direction S (FIG. 7b), but not in the second direction N (FIG. 7b).

Still referring specifically to FIGS. 24-25, the first support member 301 and the second support member 310 are coupled together at area 30. A rod 32 is coupled to area 30 at a connection point 31. In an embodiment, the first and second support members 301, 310 may be formed as a single component. As shown specifically in FIGS. 18-19 and 24, the first and second support members 301, 310 are coupled to the arms 320 and the split arm 340 and seated or positioned within a housing 380. The housing 380 is further positioned on a pedestal 360 and is configured to obscure or otherwise make inaccessible the depression plates 372 of the locking assembly 370. The pedestal 360 comprises a central bore 388 that is configured to accept the rod 32 when the first and second support members 301, 310 are seated in the housing 380. The housing 380 further comprises one or more security tabs 389 configured to further prevent access to the components of the locking assemblies 370 while the first and second support members 301, 310 are positioned within the housing 380. Referring to FIG. 20, the pedestal 360 further comprises a base portion 362 and a stem portion 364. The stem portion 364 may further define an opening 369 configured to provide access to electrical components within the pedestal or an additional locking mechanism 386 (FIG. 18). The housing 380 and the pedestal 360 may be formed as a single unitary component. In and embodiment, the security apparatus 300 may further comprise a wireless charger.

In order to assemble the security apparatus 300, the arms 320 and the split arm 340 are fully extended along the first and second support members 301, 310 by depressing or pressing down on the depression plate 372 of each lock assembly 370. The first and second support members 301, 310 are placed into the housing with the rod 32 extending through the central bore 388 of the pedestal 360. The security apparatus 300 is then secured to a display surface (not shown) via mounts 317 positioned on a bracket 399 (FIG. 24) positioned within the base portion 362 of the pedestal 360. As shown, the mounts 317 are bolts secured with wing nuts. The rod 32 is configured to extend through or traverse the display surface (not shown) and be secured on the underside of the display surface (not shown) so that the first and second support members 301, 310 cannot be separated from the housing 380.

Figures 18A, 18B:
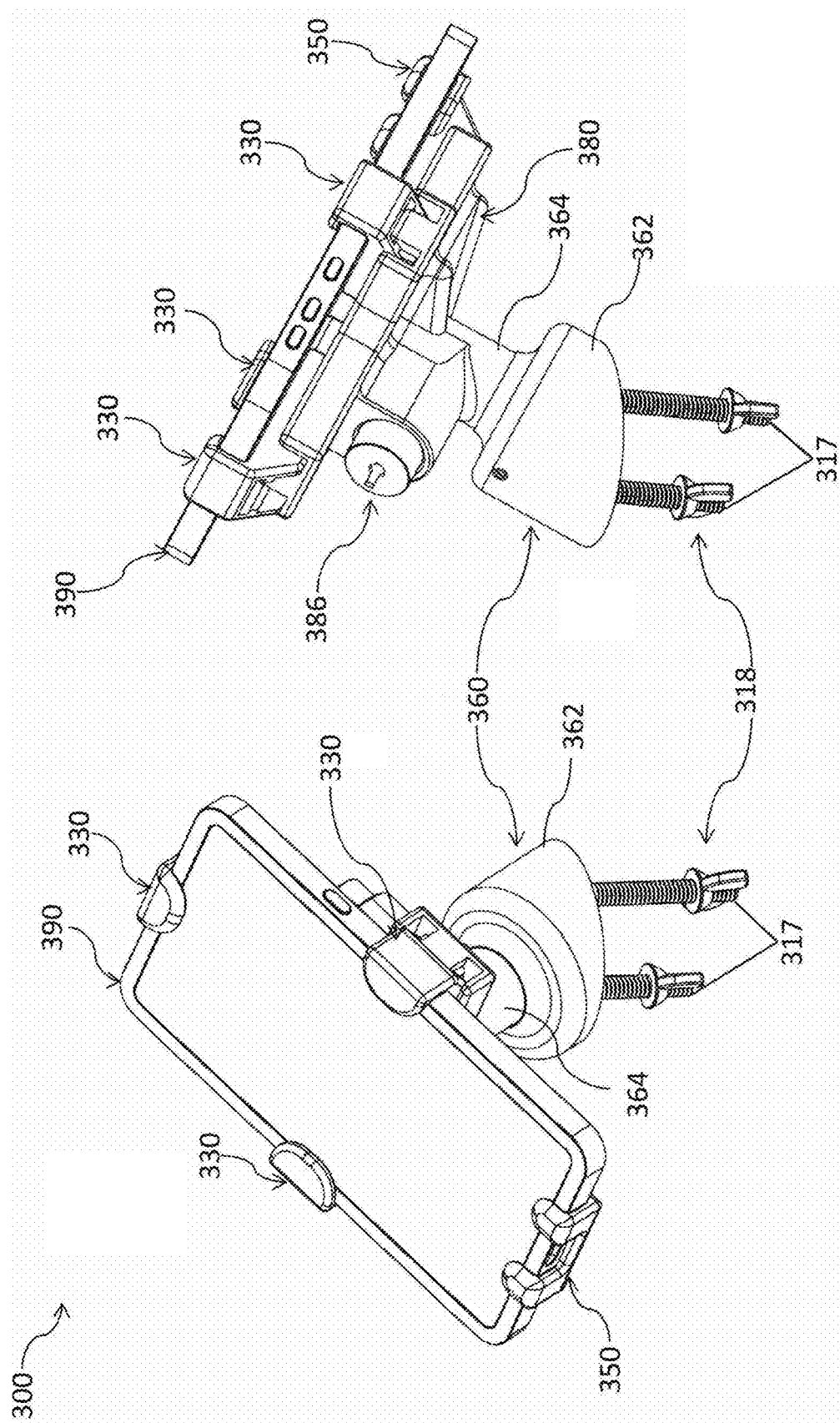
FIG. 18a illustrates a front perspective view of an embodiment of the security apparatus securing a Smart Phone.
FIG. 18b illustrates a rear perspective view of an embodiment of the security apparatus securing a Smart Phone.
Figure 19:
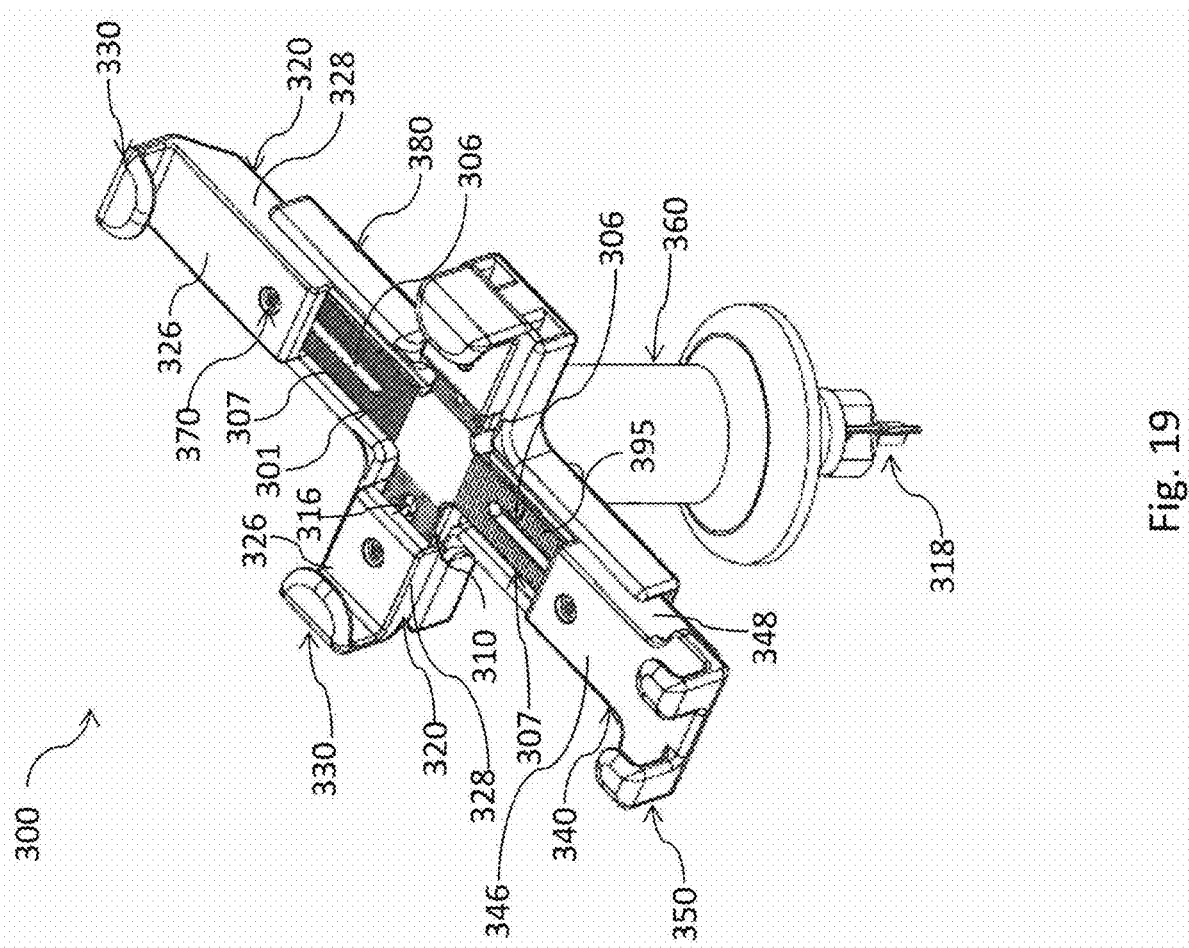
FIG. 19 illustrates a front perspective view of another embodiment of the security apparatus.

The portable electronic device 390 may be placed against the first and second support members 301, 310. Referring to FIGS. 18a-18b, the portable electronic device 390 is a Smart Phone, such as an iPhone® The arms 320 and the split arm 340 are then pushed towards the portable electronic device 390 until they trap a portion of the portable electronic device 390 under each holder lip 334, 354. As described in other embodiments, the configuration of the support member surface features 307 on the first and second support members 301, 310 and the lock surface features the lock assembly 370 allow the arms 320, and the split arm 340 to slide towards each other in the first direction S (FIG. 7b), but prevent them from being moved away from each other in the second direction N (FIG. 7b) unless the depression plate 372 is depressed. The housing 380 prevents access to the depression plates 372 of the lock assembly 370 such that the portable electronic device 390 is secured in the security apparatus 300. In this manner, the portable electronic device 390 cannot be removed from the security apparatus 300 unless the rod 32 is uncoupled from the display surface (not shown) so that the depression plates 372 of the lock assembly 370 can be accessed. In other embodiments, it is possible that only the arms 320 are configured to slide along the first and second support members 301, 310 while the split arm 340 remains in a fixed position. In still another embodiment, a split arm 340 may not be included and all four (4) of the arms 320 may be identical.

Referring to FIGS. 27-32, another embodiment of the security apparatus 400 generally comprises a first support member 401 and a second support member 410. The first and second support members 401, 410 each extend along an axis and are fastened together using one or more fasteners 411 such that the axes intersect each other at an angle that may be about 90°. In other embodiments, the security apparatus 400 may comprise additional support members depending on the portable electronic device being secured. The first support member 401 may further comprise a notch 405 (FIG. 32) or other feature that is configured to engage the second support member 410 in order to add additional strength at their junction.

Figure 28:
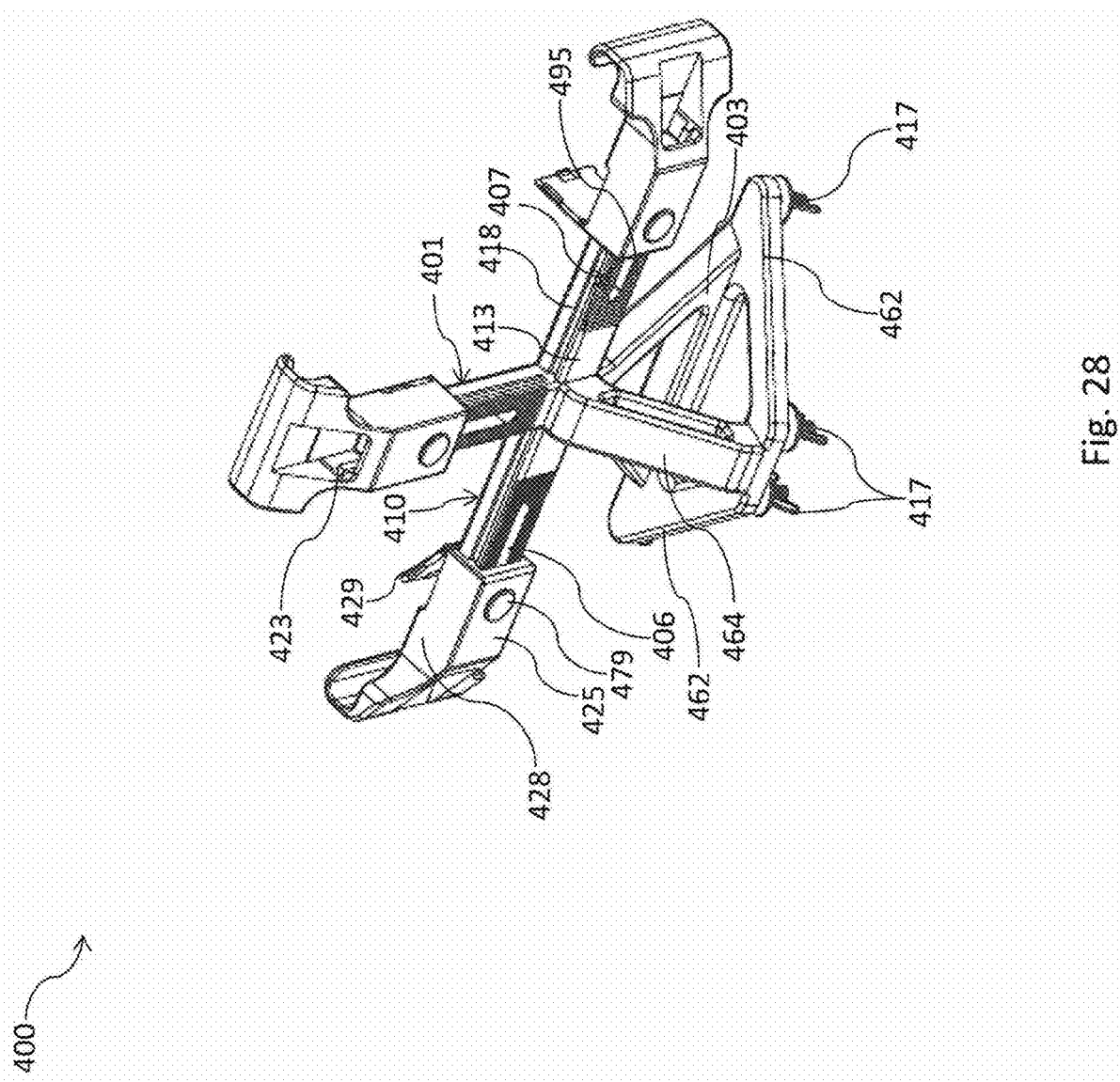
FIG. 28 illustrates a rear perspective view of an embodiment of the security apparatus.
Figure 29:
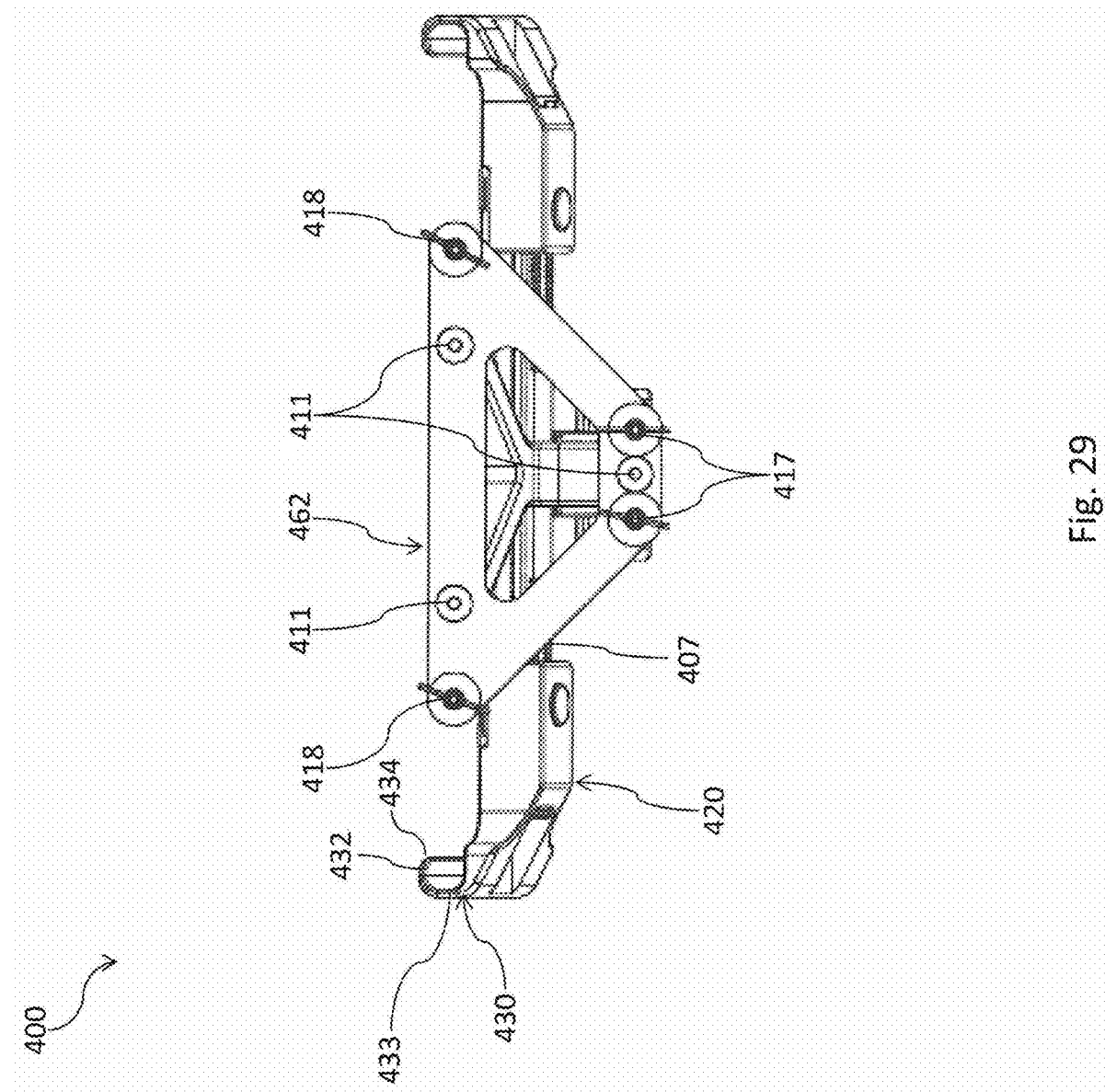
FIG. 29 illustrates a bottom plan view of an embodiment of the security apparatus.

As shown, the first and second support members 401, 410 comprise a top surface 402, 412, a bottom or rear surface 403, 413 (FIG. 28), and opposing side surfaces 404, 414. The opposing side surfaces 404, 414 further comprise a first engagement structure 408, 418 that extends or at least partially along a length of the opposing side surfaces 404, 414. Referring to FIG. 28, the rear surfaces 403, 413 of the first and second support members 401, 410 define a plurality of support member surface features and one or more elongated openings 406, 416 that extend from the rear surface 403, 413 to the top surface 402, 412. As shown, and described further below, the plurality of support member surface features 407 are a plurality of teeth similar to those described in previous embodiments, however in other embodiments the plurality of support member surface features may be ridges, depressions, grooves, or any other suitable surface feature. A depression or recess 409, 419 is defined around the perimeter of each elongated opening 406, 416 on the top surface 402, 412 of the first and second support members 401, 410. One end of the first support member 401 is coupled to an arm 420 and the opposing end is coupled to the base 462. A brace 464 extends between the base 462 and the intersection of the first and second support members 401, 410 to provide further support to the security apparatus 400. The second support member 410 is coupled to two (2) arms 420, each positioned at opposing ends of the second support member 410. As shown, the arms 420 are identical, however in other embodiments, the arms 420 may not be identical and may be configured to secure a specific object or portable electronic device.

Figure 30:
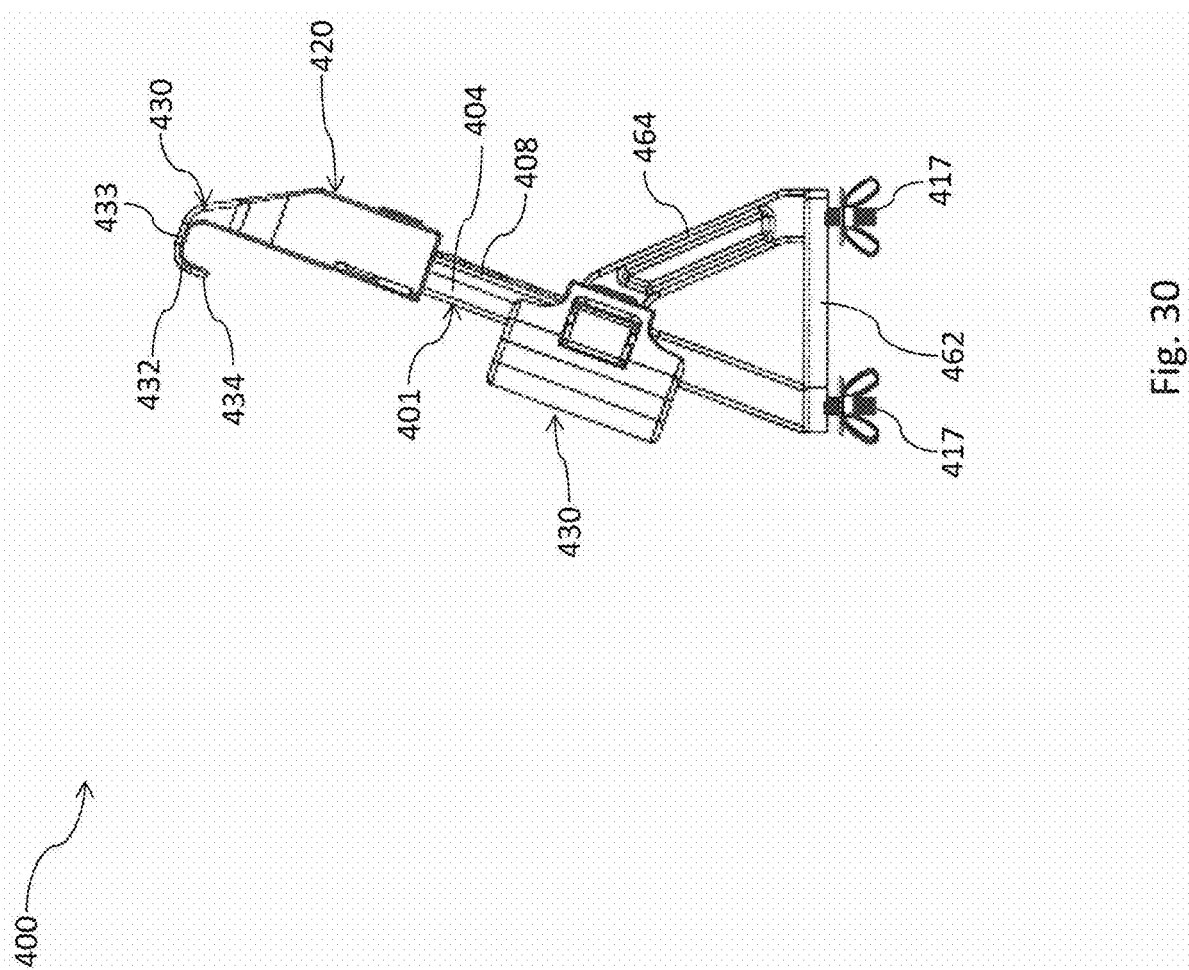
FIG. 30 illustrates a left side plan view of an embodiment of the security apparatus.
Figure 31:
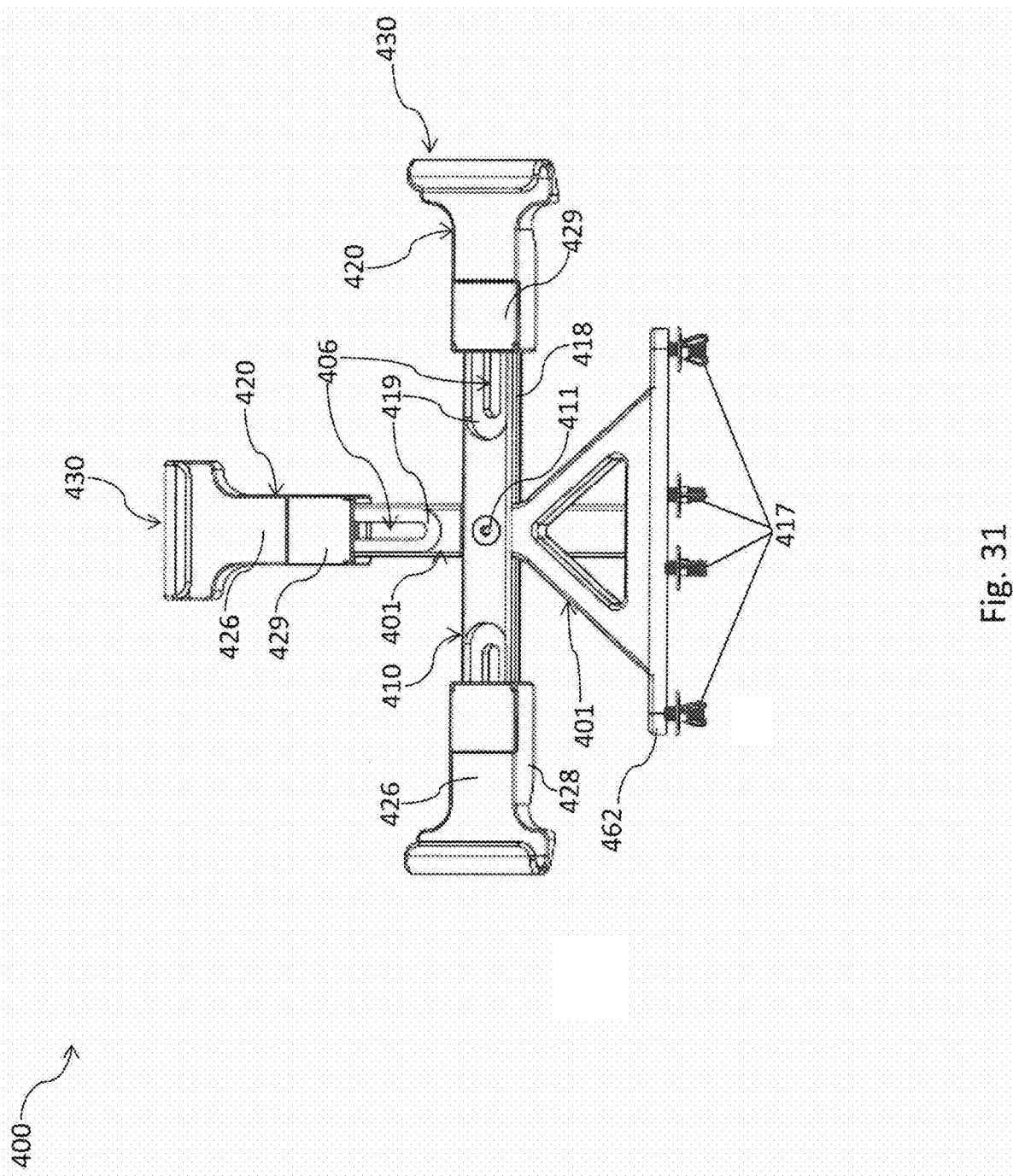
FIG. 31 illustrates a front plan view of an embodiment of the security apparatus.
Figure 32:
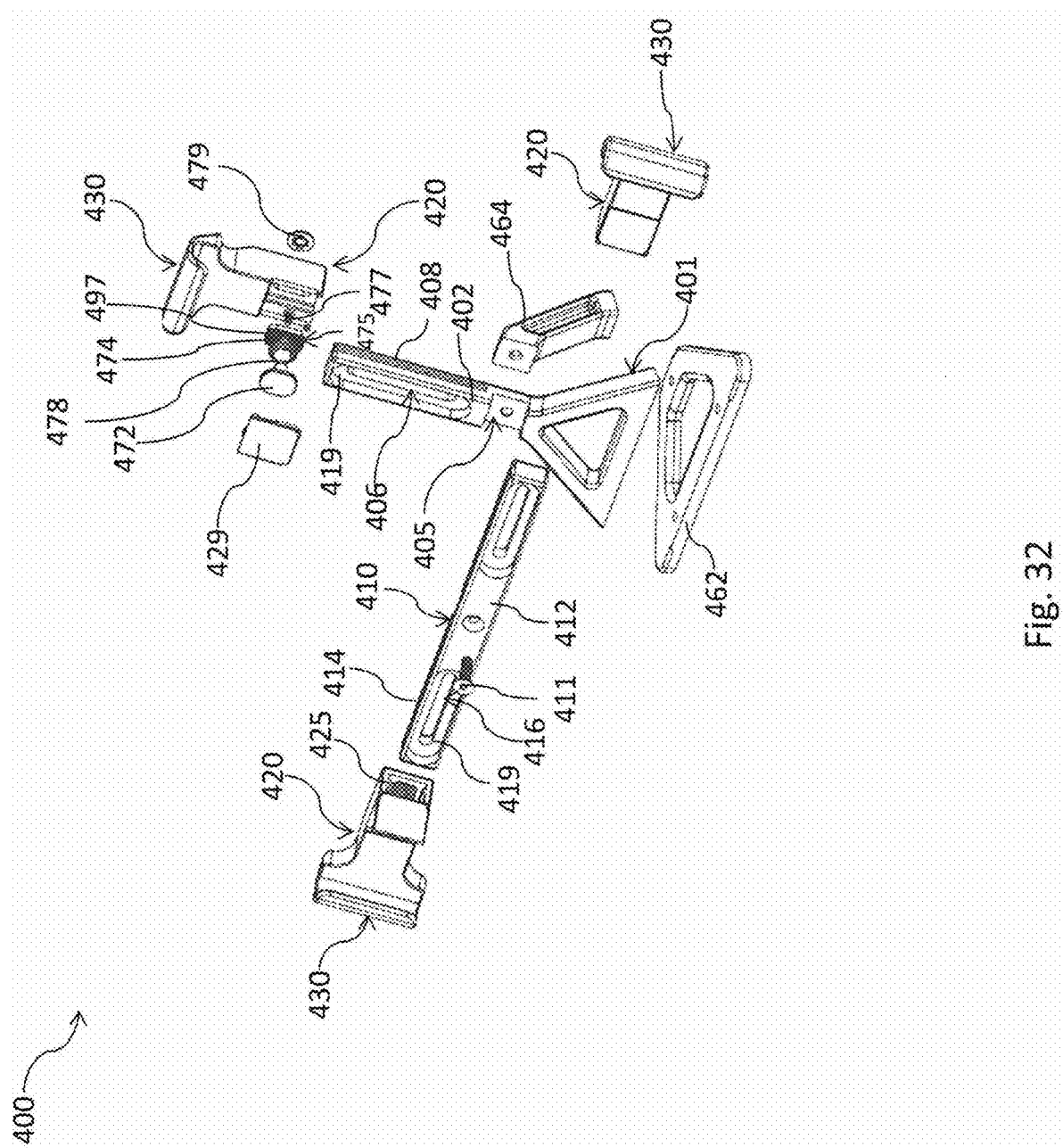
FIG. 32 illustrates an exploded view of an embodiment of the security apparatus.

As shown specifically in FIGS. 28 and 31, each arm 420 generally comprises a top surface 426, two (2) opposing side surfaces 428, and a rear surface 425. The distal end of each arm 420 comprises a holder 430. Referring to FIG. 30, the holder 430 comprises a distal end surface 433 that extends above the top surface 426 of the arm 420 and is coupled to a cap 432. The cap 432 extends from the top of the distal end surface 433 towards the opposing end of the arm 420 to form a lip 434. As shown, the top surface 426, side surfaces 428, and rear surface 425 of each arm 420 define an inner cavity and the interior surface of the opposing sides 428 further defines a second engagement structure 423 (FIG. 32). As shown, the first engagement structure 408, 418 is a channel or recess and the second engagement structure 423 is protrusion, however in other embodiments, the first engagement structure 408, 418 is a protrusion and the second engagement structure 423 is channel or recess. The second engagement structure 423 is configured to fit at least partially within the first engagement structure 408, 418 of the first and second support member 401, 410. Accordingly, the cavity is configured to at least partially house a portion of one of the first or the second support members 401, 410.

Figure 27:
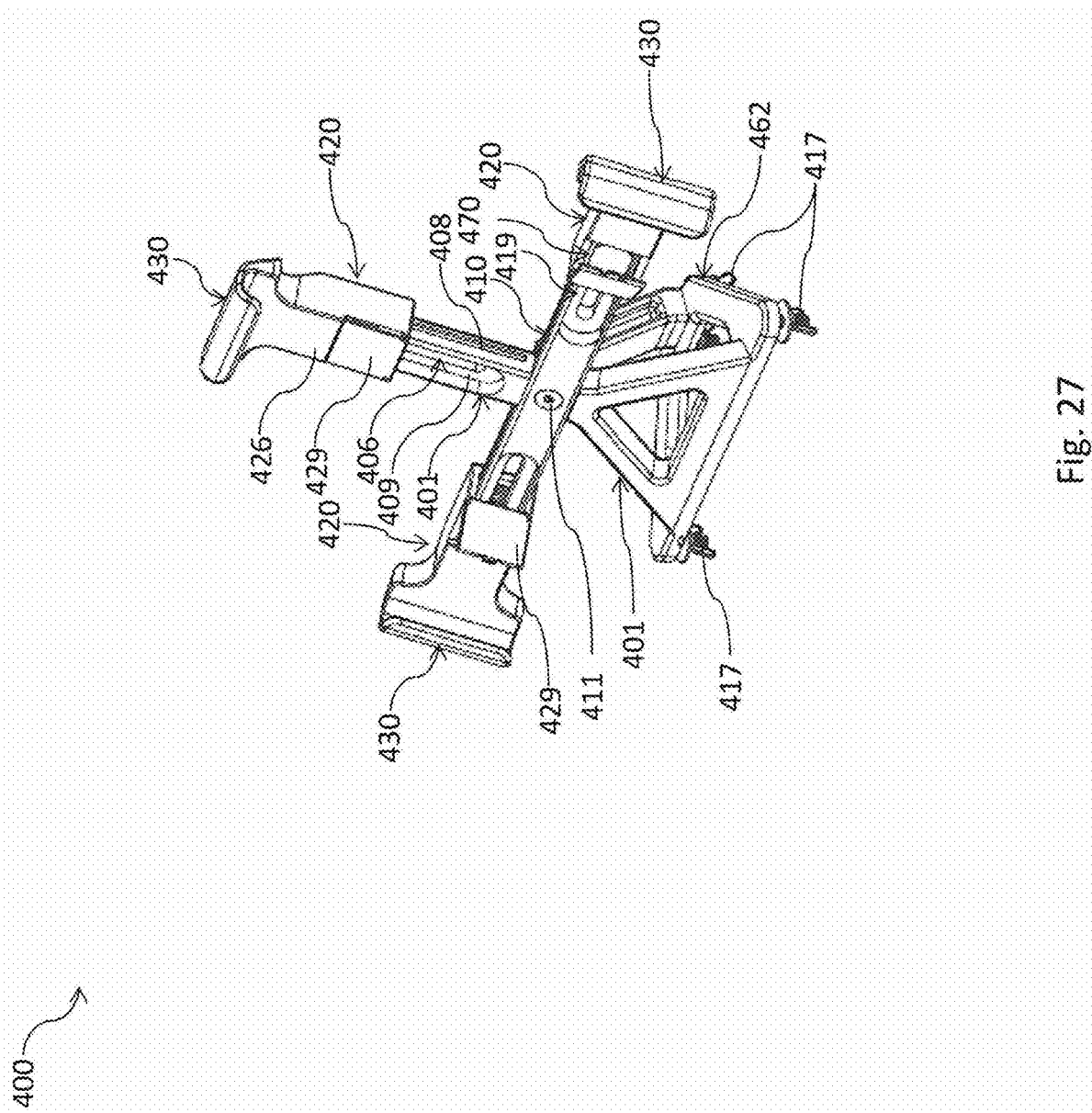
FIG. 27 illustrates a front perspective view of another embodiment of the security apparatus.

The arms 420 may further be coupled to the first and second support members 401, 410 using one or more lock assemblies 470 (FIG. 27). The one or more lock assemblies 470 are configured to further couple the arms 420 to the first and second support members 401, 410. Each lock assembly 470 comprises a plurality of lock surface features that are configured to interact with the support member surface features 407 to prevent the sliding movement of the arm 420 with respect to the first and second support member 401, 410 in the second direction N (FIG. 7b) when in a locked position, and allow the arm 420 to slide freely in the first S (FIG. 7b) and second direction N (FIG. 7b) along the first or second support member 401, 410 when in an unlocked position. The lock surface features are configured and function similar to those previously described in other embodiments. As shown in FIG. 32, the lock assembly 470 is a push-button assembly, however in other embodiments, the lock assembly 470 may not be a push-button assembly. The lock assembly 470 is configured to function in a similar manner as in the embodiments of the security apparatus (100, 200, 300) previously described.

The lock assembly 470 will be described according to its interaction with the first support member 401 as is shown in FIG. 32, however it will be understood that the lock assembly 470 interacts with the second support member 410 in a similar manner. The lock assembly 470 generally comprises a depression plate 472 and an engagement plate 474. A push rod 477 is coupled to the depression plate 472 at one end and a backing 479 at an opposing end. The engagement plate 474 is positioned between the backing 479 and the first support member 401. As shown, the push rod 477 traverses the arm 420 and extends through the elongated opening 406 of the first support member 401. The engagement plate 474 comprises a lock surface features 475 that are complimentary to the support surface features 407 and are configured to engage with the support member surface features 407 on the rear surface 403 of the first support member 401. As shown in FIG. 32, the lock surface features 475 may be teeth 497, however in other embodiments they may be any suitable shape and configuration that are complimentary to the support member surface features 407. A spring or resilient member 478 may surround part or and/or contact a portion of the depression plate 472 and be positioned between the depression plate 472 and the recess 409 to prevent over-depression of the depression plate 472. As shown, the depression plate 472 may be obscured by an access portion 429 of the arm 420. When the support member surface features 407 and the lock surface features of the engagement plate 474 are engaged, the sliding movement of the arm 420 with respect to the first support member 401 is prevented in the second direction N (FIG. 7b).

In order to secure a portable electronic device in the security apparatus 400, the arms 420 are extended in the second direction N (FIG. 7b) by depressing or pushing down on the depression plates 472 of the lock assembly 470. The portable electronic device (not shown) is then placed onto the first and second support members 401, 410, and the arms 420 are advanced towards the portable electronic device (not shown). The arms 420 are advanced in the first direction S (FIG. 7b) until a portion of the portable electronic device (not shown) is trapped under each holder 430 lip 434. The portable electronic device blocks (not shown) access to the depression plates 472 of the locking assembly 470. The security apparatus 400 is then secured to the display surface (not shown) via one or more mounts 417 in the base 462. As shown, the one or more mounts 417 are bolts secured with nuts. Coupling the security device 400 to the display surface (not shown) acts to secure the free end of the portable electronic device (not shown) by pinning it against the display surface (not shown) such that the portable electronic device (not shown) cannot be removed from the security apparatus 400 without damage to the portable electronic device (not shown).

Removal of the security apparatus 400 from the display surface (not shown) by uncoupling the one or more mounts 417, allows the portable electronic device to be removed or slid out of the security apparatus 400, thereby allowing access to the depression plates 472 of the lock assembly 470. Accordingly, the arms 420 can then be re-extended in the second direction N (FIG. 7b) to accept and secure another portable electronic device.

One or more components of the embodiments of security apparatus 100, 200, 300, 400 described above may be comprised of one or more types of metal, such as steel or aluminum, or one or more types of plastic, such as PA6 (Nylon 6), ABS (Acrylonitrile butadiene styrene), or POM (Polyoxymethylene). In an embodiment, one or more components of the security apparatus 100 may be comprised of a combination of metallic and plastic components.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus for a portable electronic device, the security apparatus comprising:
   at least one support member extending along an axis and comprising,
      a top surface,
      a bottom surface, wherein one of the top and bottom surfaces defines a plurality of support member surface features,
      at least one elongated opening extending from the top surface to the bottom surface of the at least one support member, and
      opposing side surfaces, wherein at least one of the opposing side surfaces comprises a channel facing away from the elongated opening;
   at least two arms coupled to the at least one support member and configured to hold a portable electronic device, wherein at least one of the at least two arms comprises a protrusion configured to slidably engage the channel of the at least one opposing side of the at least one support member allowing movement of the at least one of the at least two arms to slide in a first direction and a second direction opposite of the first direction along the channel; and
   at least one locking assembly positioned on at least one of the at least two arms, the at least one locking assembly comprising,
      a depression plate,
      an engagement plate comprising a plurality of lock surface features and configured to engage with the support member surface features, and
      an extension coupled to the depression plate at one end and coupled to the engagement plate at an opposing end, the extension further configured to traverse the at least one elongated opening,
   wherein the locking assembly is configured that when in a locked position, the support member surface features contact the lock surface features and enable the at least one of the at least two arms to slide in the first direction along the at least one support member and inhibiting the at least one of the at least two arms from sliding in the second direction along the at least one support member, and when configured in an unlocked position by pressing on the depression plate, the engagement plate is moved away from the at least one support member and the support member surface features and the lock surface features are decoupled enabling the at least one of the at least two arms to slide in the second direction along the at least one support member.

2. A security apparatus for a portable electronic device, the security apparatus comprising:
   at least one support member extending along an axis and comprising,
      a top surface,
      a bottom surface, wherein one of the top and bottom surfaces defines a plurality of support member surface features, and
      opposing side surfaces that face away from each other, wherein the opposing side surfaces comprise a first engagement structure;
   at least two arms coupled to the at least one support member and configured to hold a portable electronic device, wherein at least one of the at least two arms comprises a second engagement structure configured to slidably engage the first engagement structure of the opposing side surfaces of the at least one support member allowing movement of the at least one of the at least two arms to slide in a first direction and a second direction opposite of the first direction along the first engagement structure; and
   at least one locking assembly positioned on at least one of the at least two arms, the at least one locking assembly comprising a plurality of lock surface features configured to couple to the plurality of support member surface features,
   wherein the locking assembly is configured that when in a locked position, the support member surface features engage the lock surface features and enable the at least one of the at least two arms to slide in the first direction along the at least one support member and inhibit the at least one of the at least two arms from sliding in the second direction along the at least one support member, and when configured in an unlocked position by pressing on the locking assembly, the support member surface features and the lock surface features are decoupled enabling the at least one of the at least two arms to slide in the second direction along the at least one support member.

3. The security apparatus of claim 2, wherein the at least one support member defines at least one elongated opening extending from the top surface to the bottom surface.

4. The security apparatus of claim 3, wherein the at least one locking assembly further comprises,
   a depression plate,
   an engagement plate configured to engage with the plurality of surface features of the support member, and
   a push-rod coupled to the depression plate at one end and coupled to the engagement plate at an opposing end and configured to traverse the at least one elongated opening,
   wherein an unlocked state is achieved by depressing the depression plate disengages the engagement plate from the at least one support member and uncouples the plurality of lock surface features from the plurality of support member surface features.

5. The security apparatus of claim 4, wherein the plurality of support member surface features are support member teeth, and wherein the teeth are positioned at an angle relative to the axis of the at least one support member that is less than 90°.

6. The security apparatus of claim 5, wherein the plurality of lock surface features are lock surface teeth positioned at an angle relative to an axis of the engagement plate that is less than 90°, and wherein the lock surface teeth are complimentary to the support member teeth.

7. The security apparatus of claim 2, wherein the first direction is oriented toward the portable electronic device, and wherein the second direction is oriented away from the portable electronic device.

8. The security apparatus of claim 2, wherein the first engagement structure is a protrusion and the second engagement structure is a complimentary recess configured to accept at least a portion of the protrusion.

9. The security apparatus of claim 2, wherein the first engagement structure is a channel and the second engagement structure is a complimentary protrusion configured to at least partially fit within the channel.

10. A security apparatus for a portable electronic device, the security apparatus comprising:
at least one support member extending along an axis and comprising,
a top surface,
a bottom surface, wherein one of the top and bottom surfaces defines a plurality of support member surface features,
at least one elongated opening extending from the top surface to the bottom surface of the at least one support member, and
opposing side surfaces facing away from the elongated opening, wherein at least one of the opposing side surfaces comprises a first engagement structure;
at least two arms coupled to the at least one support member and configured to hold a portable electronic device, wherein at least one of the at least two arms comprises a second engagement structure configured to slidably engage the first engagement structure of the at least one opposing side of the at least one support member allowing movement of the at least one of the at least two arms to slide in a first direction and a second direction opposite of the first direction along the first engagement structure; and
at least one locking assembly positioned on at least one of the at least two arms and configured to traverse the at least one elongated opening, the at least one locking assembly comprising a plurality of lock surface features configured to couple to the plurality of support member surface features,
wherein the locking assembly is configured that when in a locked position, the support member surface features engage the lock surface features and enable the at least one of the at least two arms to slide in the first direction along the at least one support member but inhibit the at least one of the at least two arms from sliding in the second direction along the at least one support member, and when configured in an unlocked position by pressing on the locking assembly, the support member surface features and the lock surface features are decoupled enabling the at least one of the at least two arms to slide in the second direction along the at least one support member.

11. The security apparatus of claim 10, wherein each of the at least two arms further comprises a holder.

12. The security apparatus of claim 10, wherein the at least one locking assembly further comprises,
a depression plate,
an engagement plate configured to engage with the plurality of surface features of the support member, and
a push-rod coupled to the depression plate at one end and coupled to the engagement plate at an opposing end and configured to traverse the at least one elongated opening,
wherein an unlocked state is achieved by depressing the depression plate disengages the engagement plate from the at least one support member and uncouples the plurality of lock surface features from the plurality of support member surface features.

13. The security apparatus of claim 10, wherein the plurality of support member surface features are support member teeth, and wherein the teeth are positioned at an angle relative to the axis of the at least one support member that is less than 90°.

14. The security apparatus of claim 12, wherein the plurality of lock surface features are lock surface teeth positioned at an angle relative to an axis of the engagement plate that is less than 90°, and wherein the lock surface teeth are complimentary to the support member teeth.

15. The security apparatus of claim 10, wherein the first direction is oriented toward the portable electronic device, and wherein the second direction is oriented away from the portable electronic device.

16. The security apparatus of claim 10, wherein the first engagement structure is a protrusion and the second engagement structure is a complimentary channel.

17. The security apparatus of claim 10, wherein the first engagement structure is a channel and the second engagement structure is a complimentary protrusion configured to fit at least partially within the channel.

18. The security apparatus of claim 1, further comprising a second support member extending along an axis and coupled to the at least one support member, wherein the axis of the second support member intersects the axis of the at least one support member at an angle.

19. The security apparatus of claim 2, further comprising a second support member extending along an axis, wherein the axis of the second support member intersects the axis of the at least one support member at an angle.

20. The security apparatus of claim 10, further comprising a second support member extending along an axis, wherein the axis of the second support member intersects the axis of the at least one support member at an angle.

* * * * *